United States Patent
John Wilson et al.

(10) Patent No.: US 10,944,455 B2
(45) Date of Patent: Mar. 9, 2021

(54) BEAM TRACKING FOR PERIODIC USER EQUIPMENT MOVEMENT

(71) Applicant: QUALCOMM Incorporated, San Diego, CA (US)

(72) Inventors: Makesh Pravin John Wilson, San Diego, CA (US); Srinivas Yerramalli, San Diego, CA (US); Tao Luo, San Diego, CA (US); Sumeeth Nagaraja, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/281,839

(22) Filed: Feb. 21, 2019

(65) Prior Publication Data
US 2019/0268053 A1    Aug. 29, 2019

Related U.S. Application Data

(60) Provisional application No. 62/635,135, filed on Feb. 26, 2018.

(51) Int. Cl.
*H04B 7/06* (2006.01)
*H04W 24/10* (2009.01)
(Continued)

(52) U.S. Cl.
CPC ......... *H04B 7/0617* (2013.01); *H04B 7/0626* (2013.01); *H04B 7/0634* (2013.01);
(Continued)

(58) Field of Classification Search
CPC .................................................. H04B 7/0617
(Continued)

(56) References Cited

U.S. PATENT DOCUMENTS

2004/0147264 A1* 7/2004 Ogawa ............... H04W 36/30 455/441
2006/0211439 A1* 9/2006 Mizuguchi ........... H04W 52/42 455/522

(Continued)

FOREIGN PATENT DOCUMENTS

WO    WO-2017023231 A1    2/2017

OTHER PUBLICATIONS

Fujitsu: "Discussion on beam indication", 3GPP Draft, R1-1717716 Discussion on Beam Indication Final, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340901, 4 Pages, Retrieved from the Internet: URL:http://www.3gpp.org/ftp/Meetings_3GPP_SYNC/RAN1/Docs/ [retrieved on Oct. 8, 2017].

(Continued)

*Primary Examiner* — Lihong Yu
(74) *Attorney, Agent, or Firm* — Holland & Hart LLP

(57) ABSTRACT

Methods, systems, and devices for wireless communications are described techniques provide for the identification of a sequence of beamforming parameters that are used for communications between a user equipment (UE) and a base station using a sequence of transmission beams. A UE may measure received reference signals that are transmitted in a series of downlink transmission beams from a base station, and report measurement parameters associated with the downlink transmission beams to the base station as part of a beam tracking and beam refinement procedure. The base station may provide transmission configuration indicator (TCI) states that are associated with each transmission beam. The TCI states may be recorded over a course of a periodic movement of the UE, and may be used deterministically to identify beamforming parameters for transmission and (Continued)

reception of a subsequent series of downlink transmission beams when the UE makes a subsequent same periodic movement.

29 Claims, 22 Drawing Sheets

(51) Int. Cl.
  *H04W 72/04* (2009.01)
  *H04W 76/38* (2018.01)
(52) U.S. Cl.
  CPC .......... *H04B 7/0695* (2013.01); *H04W 24/10* (2013.01); *H04W 72/042* (2013.01); *H04W 76/38* (2018.02); *H04W 72/046* (2013.01)
(58) Field of Classification Search
  USPC .......................................................... 375/262
  See application file for complete search history.

(56) References Cited

U.S. PATENT DOCUMENTS

| | | | | |
|---|---|---|---|---|
| 2009/0221314 A1* | 9/2009 | Hu | ........................ | H04W 16/28 455/507 |
| 2011/0053527 A1* | 3/2011 | Hunzinger | ........... | H04B 7/0404 455/101 |
| 2012/0120817 A1* | 5/2012 | Khoshnevis | .......... | H04L 1/0026 370/252 |
| 2014/0349647 A1* | 11/2014 | Chen | ..................... | H04W 36/30 455/436 |
| 2018/0227035 A1* | 8/2018 | Cheng | .................... | H04B 7/088 |
| 2018/0227886 A1* | 8/2018 | Chou | .................. | H04W 72/042 |
| 2018/0242300 A1* | 8/2018 | Hakola | .................. | H04B 7/086 |
| 2019/0165880 A1* | 5/2019 | Hakola | ................... | H04L 1/008 |

OTHER PUBLICATIONS

Huawei et al., "Beam Measurement and Reporting", 3GPP Draft; 3GPP TSG RAN WG1 Meeting NR#3, R1-1715467, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338935, 9 Pages, Retrieved from the Internet: URL:http://www.3gpp.org/ftp/Meetings_3GPP_SYNC/RAN1/Docs/ [retrieved on Sep. 17, 2017] Sections 1, 3.1, 4.4.
International Search Report and Written Opinion—PCT/US2019/019193—ISA/EPO—May 9, 2019.

* cited by examiner

BEAM TRACKING FOR PERIODIC USER EQUIPMENT MOVEMENT

CROSS REFERENCES

The present Application for Patent claims the benefit of U.S. Provisional Patent Application No. 62/635,135 by JOHN WILSON et al., entitled "BEAM TRACKING FOR PERIODIC USER EQUIPMENT MOVEMENT," filed Feb. 26, 2018, assigned to the assignee hereof, and expressly incorporated herein.

BACKGROUND

The following relates generally to wireless communication, and more specifically to beam tracking for periodic user equipment movement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless communication systems may be deployed in settings in which UEs may be located within an area and communicate with a same base station or set of base stations for a relatively long time duration. For example, UEs within some industrial Internet of Things (IoT) settings may communicate periodic traffic with a base station within deterministic synchronous cycles over relatively long periods of time. These UEs may transmit and receive small payloads, which may allow for a large number of UEs to operate within the IoT system. When operating with relatively large numbers of UEs within such a system, reduction of overhead transmissions can enhance system operation and efficiency, and thus techniques for reducing a number of overhead transmissions within such systems are desirable.

SUMMARY

The described techniques relate to improved methods, systems, devices, or apparatuses that support beam tracking for periodic user equipment movement. Generally, the described techniques provide for the identification of a sequence of beamforming parameters that are used for communications between a user equipment (UE) and a base station using a sequence of transmission beams. The sequence of beamforming parameters may allow the transmission beams to track periodic UE movement with reduced reference signal transmissions and overhead signaling associated with beam tracking procedures. In some cases, a UE may periodically measure received reference signals that are transmitted in a series of downlink transmission beams from a base station. The UE may report measurement parameters associated with the downlink transmission beams to the base station as part of a beam tracking and beam refinement procedure, and the base station may provide transmission configuration indicator (TCI) states that are associated with each transmission beam. The TCI states may be recorded over a course of a periodic movement of the UE, and may be used deterministically to identify beamforming parameters for transmission and reception of a subsequent series of downlink transmission beams when the UE makes a subsequent same periodic movement.

A method of wireless communication is described. The method may include initiating, at a UE, measurements of received reference signals that are to be transmitted in a set of downlink transmission beams from a base station, measuring, responsive to the initiating, one or more parameters of each of the received reference signals to generate a set of sets of measured beam parameters each associated with a corresponding downlink transmission beam, reporting, to the base station, each of the set of sets of measured beam parameters, receiving, responsive to the reporting the set of sets of measured beam parameters, a set of TCI states for use in deterministically receiving a subsequent set of sequential transmission beams from the base station, and storing, at the UE, the set of TCI states.

An apparatus for wireless communication is described. The apparatus may include a processor, memory in electronic communication with the processor, and instructions stored in the memory. The instructions may be executable by the processor to cause the apparatus to initiate, at a UE, measurements of received reference signals that are to be transmitted in a set of downlink transmission beams from a base station, measure, responsive to the initiating, one or more parameters of each of the received reference signals to generate a set of sets of measured beam parameters each associated with a corresponding downlink transmission beam, report, to the base station, each of the set of sets of measured beam parameters, receive, responsive to the reporting the set of sets of measured beam parameters, a set of TCI states for use in deterministically receiving a subsequent set of sequential transmission beams from the base station, and store, at the UE, the set of TCI states.

Another apparatus for wireless communication is described. The apparatus may include means for initiating, at a UE, measurements of received reference signals that are to be transmitted in a set of downlink transmission beams from a base station, measuring, responsive to the initiating, one or more parameters of each of the received reference signals to generate a set of sets of measured beam parameters each associated with a corresponding downlink transmission beam, reporting, to the base station, each of the set of sets of measured beam parameters, receiving, responsive to the reporting the set of sets of measured beam parameters, a set of TCI states for use in deterministically receiving a subsequent set of sequential transmission beams from the base station, and storing, at the UE, the set of TCI states.

A non-transitory computer-readable medium storing code for wireless communication is described. The code may include instructions executable by a processor to initiate, at a UE, measurements of received reference signals that are to be transmitted in a set of downlink transmission beams from a base station, measure, responsive to the initiating, one or more parameters of each of the received reference signals to generate a set of sets of measured beam parameters each associated with a corresponding downlink transmission beam, report, to the base station, each of the set of sets of measured beam parameters, receive, responsive to the reporting the set of sets of measured beam parameters, a set of TCI states for use in deterministically receiving a subsequent set of sequential transmission beams from the base station, and store, at the UE, the set of TCI states.

In some examples of the method, apparatuses, and non-transitory computer-readable medium described herein, the measuring the one or more parameters of each of the received reference signals may include operations, features, means, or instructions for measuring a first reference signal in a first transmission slot, and measuring one or more subsequent reference signals in one or more subsequent transmission slots, each of the one or more subsequent transmission slots being at predetermined intervals.

In some examples of the method, apparatuses, and non-transitory computer-readable medium described herein, the predetermined intervals may be configured at the UE by the base station.

In some examples of the method, apparatuses, and non-transitory computer-readable medium described herein, the initiating the measurements of received reference signals may include operations, features, means, or instructions for receiving a trigger indication from the base station to initiate the measurements of received reference signals.

In some examples of the method, apparatuses, and non-transitory computer-readable medium described herein, the trigger indication may be received in radio resource control (RRC) signaling, a medium access control (MAC) control element, in downlink control information (DCI), or any combination thereof.

Some examples of the method, apparatuses, and non-transitory computer-readable medium described herein may further include operations, features, means, or instructions for receiving, from the base station, a second indication that the base station may be starting transmission of the set of sequential transmission beams, and applying the set of TCI states in a deterministic manner to generate receive beamforming parameters for use in receiving each transmission beam of the set of sequential transmission beams.

In some examples of the method, apparatuses, and non-transitory computer-readable medium described herein, the second indication may be received in a DCI transmission from the base station, in a MAC control element from the base station, in radio resource control signaling from the base station, or any combination thereof.

In some examples of the method, apparatuses, and non-transitory computer-readable medium described herein, the applying the set of TCI states may include operations, features, means, or instructions for identifying a first TCI state of the set of TCI states for a first transmission beam of the set of sequential transmission beams, and identifying subsequent TCI states of the set of TCI states for remaining transmission beams of the set of sequential transmission beams based on the first TCI state and subsequent deterministic TCI states that follow the first TCI state.

In some examples of the method, apparatuses, and non-transitory computer-readable medium described herein, the identifying the subsequent TCI states may be performed independently of signaling from the base station.

In some examples of the method, apparatuses, and non-transitory computer-readable medium described herein, the set of TCI states may include operations, features, means, or instructions for receiving an indication of a first TCI state from the table of TCI states that may be to be used in receiving a first transmission beam of the set of sequential transmission beams, and receiving the first transmission beam using receive beamforming parameters that may be based on the first TCI state.

In some examples of the method, apparatuses, and non-transitory computer-readable medium described herein, the UE stores a set of analog beamforming weight configurations that each may have an associated identification (ID), and where each TCI state of the set of TCI states indicates an ID for one of the set of analog beamforming weight configurations.

In some examples of the method, apparatuses, and non-transitory computer-readable medium described herein, the set of TCI states includes a first subset of TCI states for receiving control resource set transmission beams and a second subset TCI states for receiving physical downlink shared channel (PDSCH) transmission beams.

In some examples of the method, apparatuses, and non-transitory computer-readable medium described herein, the measuring one or more parameters of each of a set of reference signals may be performed as part of a beam selection procedure, a beam refinement procedure, or any combinations thereof.

Some examples of the method, apparatuses, and non-transitory computer-readable medium described herein may further include operations, features, means, or instructions for repeating the measuring, the reporting, and the receiving until a deactivation of the measurements of received reference signals.

In some examples of the method, apparatuses, and non-transitory computer-readable medium described herein, the deactivation corresponds to an expiration of a timer associated with the measurements of received reference signals or a receipt of a deactivation indication from the base station.

Some examples of the method, apparatuses, and non-transitory computer-readable medium described herein may further include operations, features, means, or instructions for determining that a repetitive order of transmission beam parameters corresponding to the set of TCI states may be occurring, and transmitting a signal to the base station to initiate using the set of TCI states to receive one or more subsequent transmission beams from the base station.

Some examples of the method, apparatuses, and non-transitory computer-readable medium described herein may further include operations, features, means, or instructions for using the set of TCI states to receive two or more subsequent transmission beams from the base station, and measuring a tracking reference signal (TRS) associated with the two or more subsequent transmission beams for beam tracking and channel quality information feedback.

In some examples of the method, apparatuses, and non-transitory computer-readable medium described herein, the one or more parameters for the TRS may be determined based on the set of TCI states.

Some examples of the method, apparatuses, and non-transitory computer-readable medium described herein may further include operations, features, means, or instructions for receiving a trigger for an aperiodic channel state information reference signal (CSI-RS) measurement from the base station, receiving the CSI-RS using a TCI state selected from the set of TCI states, measuring one or more channel quality parameters based on the CSI-RS, and transmitting the measured one or more channel quality parameters to the base station.

Some examples of the method, apparatuses, and non-transitory computer-readable medium described herein may further include operations, features, means, or instructions for receiving one or more TCI states based on the measured one or more channel quality parameters.

Some examples of the method, apparatuses, and non-transitory computer-readable medium described herein may further include operations, features, means, or instructions for receiving one or more subsequent transmissions from the base station using one or more of the set of TCI states, measuring one or more channel quality characteristics of the one or more subsequent transmissions, and determining a beam failure based at least on part on one or more of the channel quality characteristics being below a threshold.

Some examples of the method, apparatuses, and non-transitory computer-readable medium described herein may further include operations, features, means, or instructions for periodic measurements, or semi-periodic measurements, or a combination thereof.

Some examples of the method, apparatuses, and non-transitory computer-readable medium described herein may further include operations, features, means, or instructions for measuring the one or more parameters includes.

A method of wireless communication is described. The method may include transmitting, from a base station, an indication to a UE to initiate measurements of periodically transmitted reference signals that are to be transmitted in a set of downlink transmission beams from the base station, transmitting a set of reference signals to the UE via the set of downlink transmission beams, each successive reference signal of the set of reference signals transmitted at predetermined time period following a prior reference signal transmission, receiving, from the UE, one or more parameters associated with each of the set of reference signals, determining a set of TCI states for use in deterministically transmitting a subsequent set of sequential transmission beams to the UE, storing, at the base station, the set of TCI states, and transmitting the set of TCI states to the UE.

An apparatus for wireless communication is described. The apparatus may include a processor, memory in electronic communication with the processor, and instructions stored in the memory. The instructions may be executable by the processor to cause the apparatus to transmit, from a base station, an indication to a UE to initiate measurements of periodically transmitted reference signals that are to be transmitted in a set of downlink transmission beams from the base station, transmit a set of reference signals to the UE via the set of downlink transmission beams, each successive reference signal of the set of reference signals transmitted at predetermined time period following a prior reference signal transmission, receive, from the UE, one or more parameters associated with each of the set of reference signals, determine a set of TCI states for use in deterministically transmitting a subsequent set of sequential transmission beams to the UE, store, at the base station, the set of TCI states, and transmit the set of TCI states to the UE.

Another apparatus for wireless communication is described. The apparatus may include means for transmitting, from a base station, an indication to a UE to initiate measurements of periodically transmitted reference signals that are to be transmitted in a set of downlink transmission beams from the base station, transmitting a set of reference signals to the UE via the set of downlink transmission beams, each successive reference signal of the set of reference signals transmitted at predetermined time period following a prior reference signal transmission, receiving, from the UE, one or more parameters associated with each of the set of reference signals, determining a set of TCI states for use in deterministically transmitting a subsequent set of sequential transmission beams to the UE, storing, at the base station, the set of TCI states, and transmitting the set of TCI states to the UE.

A non-transitory computer-readable medium storing code for wireless communication is described. The code may include instructions executable by a processor to transmit, from a base station, an indication to a UE to initiate measurements of periodically transmitted reference signals that are to be transmitted in a set of downlink transmission beams from the base station, transmit a set of reference signals to the UE via the set of downlink transmission beams, each successive reference signal of the set of reference signals transmitted at predetermined time period following a prior reference signal transmission, receive, from the UE, one or more parameters associated with each of the set of reference signals, determine a set of TCI states for use in deterministically transmitting a subsequent set of sequential transmission beams to the UE, store, at the base station, the set of TCI states, and transmit the set of TCI states to the UE.

In some examples of the method, apparatuses, and non-transitory computer-readable medium described herein, the transmitting the set of reference signals may include operations, features, means, or instructions for transmitting a first reference signal via a first transmission beam in a first transmission slot, and transmitting one or more subsequent reference signals via one or more subsequent transmission beams in one or more subsequent transmission slots, each of the one or more subsequent transmission slots being at predetermined intervals.

Some examples of the method, apparatuses, and non-transitory computer-readable medium described herein may further include operations, features, means, or instructions for configuring the UE to measure the reference signals at the predetermined intervals.

Some examples of the method, apparatuses, and non-transitory computer-readable medium described herein may further include operations, features, means, or instructions for transmitting a trigger indication to the UE to initiate the measurements of the periodically transmitted reference signals.

In some examples of the method, apparatuses, and non-transitory computer-readable medium described herein, the trigger indication may be transmitted in RRC signaling, a MAC control element, in DCI, or any combination thereof.

Some examples of the method, apparatuses, and non-transitory computer-readable medium described herein may further include operations, features, means, or instructions for transmitting, to the UE, a second indication that the base station may be starting transmission of the set of sequential transmission beams, and applying the set of TCI states in a deterministic manner to generate transmit beamforming parameters for use in transmitting each transmission beam of the set of sequential transmission beams.

In some examples of the method, apparatuses, and non-transitory computer-readable medium described herein, the second indication may be transmitted in a DCI transmission, in a MAC control element, in radio resource control signaling, or any combination thereof.

In some examples of the method, apparatuses, and non-transitory computer-readable medium described herein, the applying the set of TCI states may include operations, features, means, or instructions for identifying a first TCI state of the set of TCI states for a first transmission beam of the set of sequential transmission beams, and identifying subsequent TCI states of the set of TCI states for remaining transmission beams of the set of sequential transmission beams based on the first TCI state and subsequent deterministic TCI states that follow the first TCI state.

In some examples of the method, apparatuses, and non-transitory computer-readable medium described herein, the set of TCI states may include operations, features, means, or instructions for transmitting an indication of a first TCI state from the table of TCI states that may be to be used by the UE in receiving a first transmission beam, and transmitting the first transmission beam using beamforming parameters that may be based on the first TCI state.

In some examples of the method, apparatuses, and non-transitory computer-readable medium described herein, the base station stores a set of analog beamforming weight configurations that each may have an associated ID, and where each TCI state of the set of TCI states indicates an ID for one of the set of analog beamforming weight configurations.

In some examples of the method, apparatuses, and non-transitory computer-readable medium described herein, the set of TCI states includes a first subset of TCI states for transmitting control resource set transmission beams and a second subset TCI states for transmitting PDSCH transmission beams.

Some examples of the method, apparatuses, and non-transitory computer-readable medium described herein may further include operations, features, means, or instructions for determining that a repetitive order of transmission beam parameters corresponding to the set of TCI states may be occurring, and transmitting a signal to the base station to initiate using the set of TCI states to receive one or more subsequent transmission beams from the base station.

Some examples of the method, apparatuses, and non-transitory computer-readable medium described herein may further include operations, features, means, or instructions for using the set of TCI states for transmitting two or more subsequent transmission beams to the UE, and transmitting, in each of the two or more subsequent transmission beams, a TRS for beam tracking and channel quality information feedback from the UE.

Some examples of the method, apparatuses, and non-transitory computer-readable medium described herein may further include operations, features, means, or instructions for transmitting a trigger for an aperiodic CSI-RS measurement by the UE, transmitting the CSI-RS using a set of transmission beam parameters selected from the set of TCI states, and receiving one or more measured channel quality parameters from the UE.

Some examples of the method, apparatuses, and non-transitory computer-readable medium described herein may further include operations, features, means, or instructions for performing a beam refinement procedure based on the received one or more measured channel quality parameters, updating one or more of the TCI states based on the beam refinement procedure, and transmitting the one or more updated TCI states to the UE.

In some examples of the method, apparatuses, and non-transitory computer-readable medium described herein, determining the set of TCI states may include operations, features, means, or instructions for determining at least a first TCI state associated with a first transmission reception point (TRP) and a second TCI state associated with a second TRP, where the one or more parameters associated with each of the set of reference signals include one or more parameters associated with reference signals from the first TRP and one or more parameters associated with reference signals from the second TRP.

Some examples of the method, apparatuses, and non-transitory computer-readable medium described herein may further include operations, features, means, or instructions for periodic measurements, or semi-periodic measurements, or a combination thereof.

DETAILED DESCRIPTION

Figure 1:
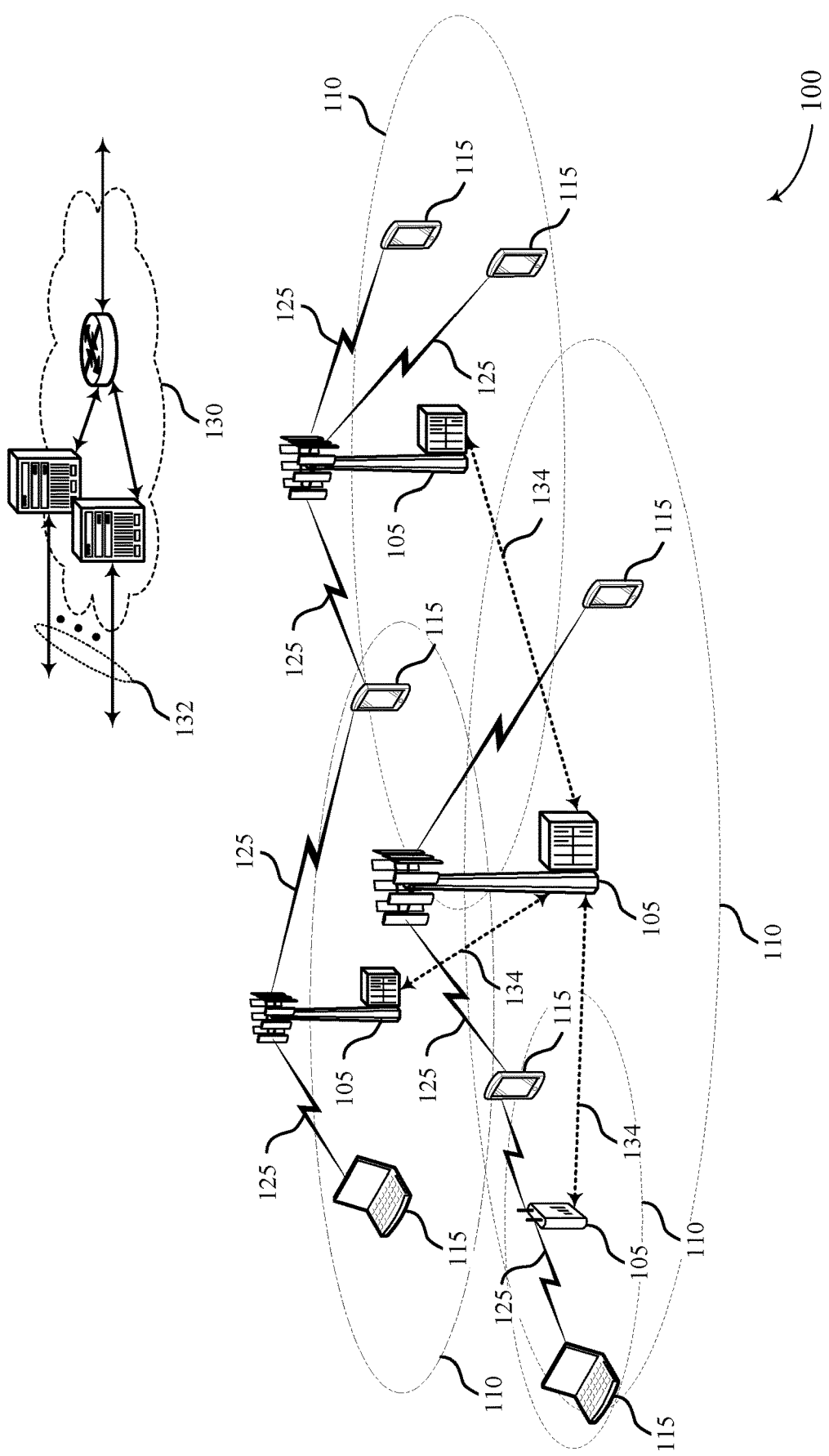
FIG. 1 illustrates an example of a system for wireless communication that supports beam tracking for periodic user equipment movement in accordance with aspects of the present disclosure.

Various techniques provided herein allow for efficient communications in systems where a user equipment (UE) may have periodic movement. In some cases, a UE may have repetitive motion in which channel characteristics for transmissions to and from the UE may have corresponding repetitive changes. For example, a UE may be associated with a piece of equipment that is subject to repetitive motion in an industrial Internet of Things (IoT). Wireless channel characteristics for transmissions to and from the UE during such repetitive motion may change according to a deterministic pattern. Furthermore, some systems may use beamforming techniques in which directional transmission beams be transmitted between the base station and the UE, and different direction transmission beams may be used that follow a pattern associated with the position of the UE in the repetitive motion.

In some cases, the UE and a base station may identify a sequence of beamforming parameters that allow the transmission beams to track periodic UE movement with reduced reference signal transmissions and overhead signaling associated with beam tracking procedures. In some cases, a UE may initiate recording of beam tracking parameters over a course of a repetitive motion of the UE, and may measure received reference signals that are transmitted in a series of downlink transmission beams from a base station. The UE may report measurement parameters associated with the downlink transmission beams to the base station, and the base station may provide transmission configuration indicator (TCI) states that are associated with each transmission beam. The TCI states may be recorded over a course of the periodic movement of the UE, and may be used deterministically to identify beamforming parameters for transmission and reception of a subsequent series of downlink transmission beams when the UE makes a subsequent same periodic movement.

At a subsequent point in time, the UE may make the same movement, and the base station and UE may use the identified beamforming parameters in a deterministic fashion for transmitting and receiving transmission beams. Such techniques may allow a UE and a base station to select beamforming parameters for a number of transmission beams with reduced signaling. In some cases, the base station may transmit fewer reference signals, and the UE may transmit fewer measurement reports for beam tracking and refinement procedures, which may reduce signaling overhead in the system and enhance overall system efficiency. Furthermore, in some industrial IoT systems, a relatively large number of UEs may be concentrated within a relatively small area, and cumulative overhead reduction for the large number of UEs can lead to significant increases in system efficiency. Reduced beam tracking procedures may also reduce processing overhead at the UE and base station and reduce overall energy consumption.

Aspects of the disclosure are initially described in the context of a wireless communications system that may use beam tracking techniques of various examples. Aspects of the disclosure are further illustrated by and described with reference to apparatus diagrams, system diagrams, and flowcharts that relate to beam tracking for periodic user equipment movement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, one or more UEs 115 may be subject to repetitive motion, and the UEs 115 and base stations 105 may store a number of TCIs that may be used to determine beamforming parameters in a deterministic fashion transmission beams transmitted at different points during the repetitive motion.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, industrial equipment, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, sensor monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

As indicated above, in some cases a UE 115 may be subject to repetitive motion (e.g., when coupled with an industrial machine that periodically moves in a repetitive manner). Furthermore, the repetitive motion of such a UE 115 may cause the UE 115 to travel in such a manner that two or more transmission beams having different transmission beam directions may be used for communication between the UE 115 and a base station 105. Various aspects of the present disclosure provide techniques for beam management that may exploit such repetitive motion to identify deterministic beamforming parameters that may be applied during repetitive motion of the UE 115 with reduced or eliminated beam tracking or beam refinement procedures.

Figure 2:
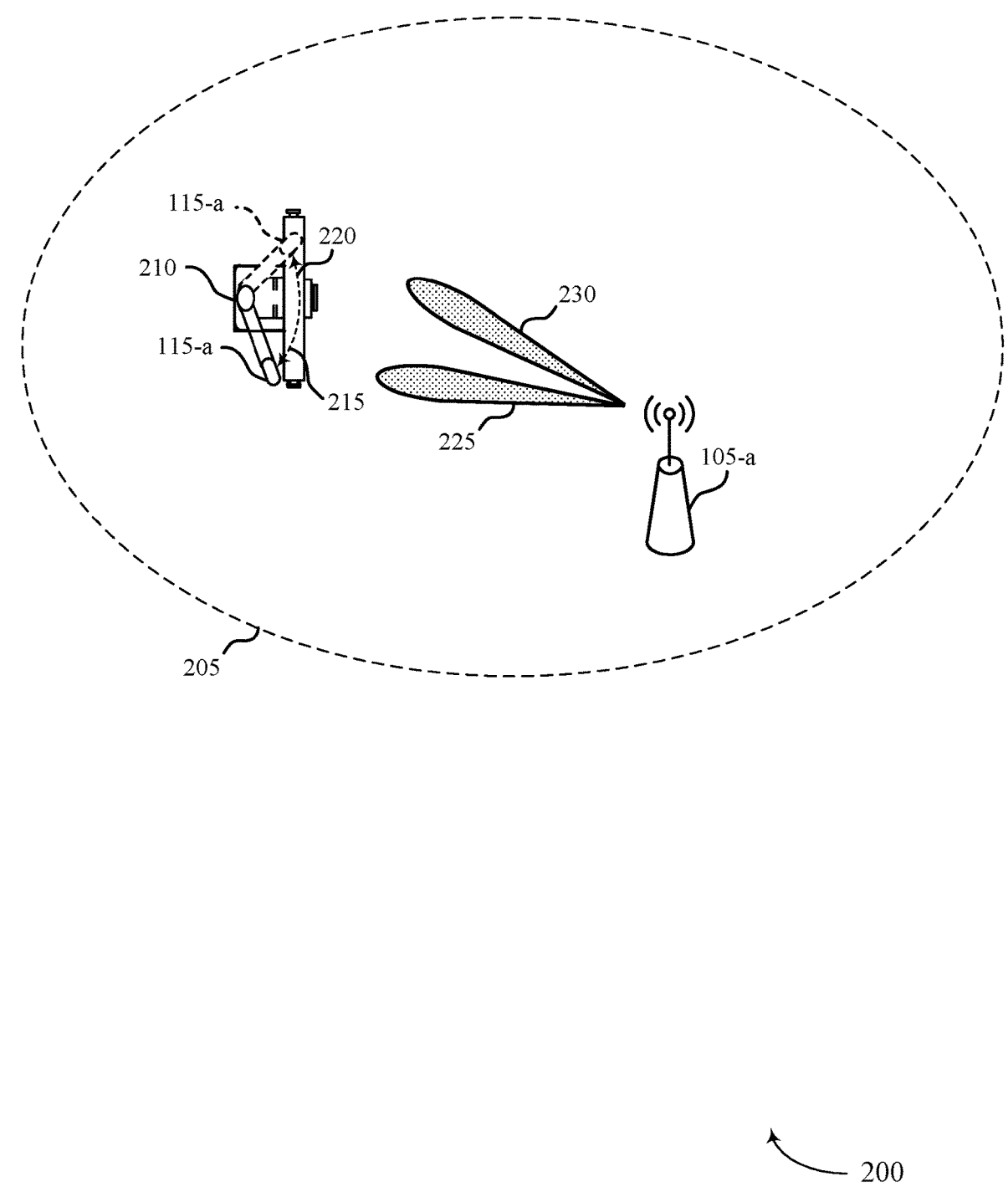
FIG. 2 illustrates an example of a portion of a wireless communication system that supports beam tracking for periodic user equipment movement in accordance with aspects of the present disclosure.

FIG. 2 illustrates an example of a wireless communication system 200 that supports beam tracking for periodic user equipment movement in accordance with various aspects of the present disclosure. In some examples, wireless communication system 200 may implement aspects of wireless communication system 100. In the example of FIG. 2, the wireless communication system 200 may include a base station 105-a, which may be an example of base stations 105 of FIG. 1 that may have a coverage area 205. The wireless communication system 200 may also include a UE 115-a, which may be an example of UEs 115 of FIG. 1.

In this example, the UE 115-a may be located on an industrial machine 210 and the UE 115-a may move from a first location to a second location as indicated at 215. For example, the UE 115-a may be located at an end of a robotic arm that repetitively moves between two or more positions, illustrated as a first position 215 and a second position 220 in the example of FIG. 2. It will be understood that this example is provided for purposes of discussion and illustration only, and numerous different situations may arise where a UE 115-a may experience repetitive movement. Continuing with the example of FIG. 2, the base station 105-a may transmit a first transmission beam 225 for communications with the UE 115-a when the UE 115-a is located at the first position. Similarly, the base station 105-a may transmit a second transmission beam 230 for communications with the UE 115-a when the UE 115-a is located at the second position. The first transmission beam 225 may have a first set of beamforming parameters that may be determined based on a first TCI state, and the second transmission beam 230 may have a second set of beamforming parameters that may be determined based on a second TCI state. In some examples, the UE 115-a may have one or more additional TCI states that may be associated with one or more intermediate locations along the path between the first position 215 and the second position 220.

In some cases, the first transmission beam 225 may be established through beam selection and beam refinement techniques that may be used for beamformed transmissions. Such beam selection and beam refinement procedures may include the base station 105-a transmitting one or more beams that include one or more reference signals, such as a channel state information reference signal (CSI-RS). The timing and resources used for beam and reference signal transmissions may be provided in a synchronization signal (SS) block, and may be used for beam selection and beam refinement procedures. The UE 115-a may monitor for the CSI-RS transmission via the first transmission beam 225 and measure one or more parameters (e.g., power, phase, and timing measurements) associated with the first transmission beam 225. The UE 115-a may report the measurements to the base station 105-a, which may determine one or more beam refinements. In some cases, A TCI state may be updated to provide beamforming parameters that are to be used by the UE 115-a and the base station 105-a for receiving, or transmitting, or both, the first transmission beam 225. Similar techniques may be used for beam selection and beam refinement of the second transmission beam 230.

In cases where the UE 115-a repetitively moves between the first position 215 and the second position 220, the respective TCI states, as well as one or more intermediate TCI states, may be stored and used to determine beamforming parameters. In such cases, TCI states may be determined and used in two stages. In a first stage, which may be referred to as a RecordMode phase or calibration phase, beam configurations (or spatial filter configurations) may be stored at the UE 115-a and the base station 105-a for each of two or more different times. For example, the base station 105-a may transmit and the UE 115-a may measure a CSI-RS once every 10 or 20 slots. The UE 115-a may report the measurements to the base station 105-a, which may determine a beam configuration for each of the different times and provide the beam configurations to the UE 115-a. Both the UE 115-a and the base station 105-a may store the different beam configurations. In some cases, each beam configuration may be associated with a TCI state, and a single TCI state over each unit of time may be stored. In other cases, a table of TCI states may be provided and an index into the table may be stored for each unit of time. In some cases, channel quality information (CQI) may also be stored for each unit of time.

In a second stage, which may be referred to as a RecordPlay phase, the information may be used to determine beam configurations during a movement of the UE 115-a, without additional CSI-RS transmissions, measurement, or reporting. In such cases, the base station 105-a may transmit a sequence of transmission beams using beamforming parameters that are applied in a deterministic fashion to the sequence of transmission beams, and the UE 115-a may perform receive beamforming using beamforming parameters that are applied in the deterministic fashion to receive the sequence of transmission beams. In some cases, the base station 105-a may indicate to the UE 115 a that a particular TCI state is to be used for an initial transmission beam, with subsequent TCI states deterministically identified based on the stored TCI states to identify receive beamforming parameters. Thus, when in the RecordPlay phase, the base station 105-a may not transmit CSI-RS, or may transmit a reduced number of CSI-RSs, which may free up wireless resources for other transmissions. Likewise, the UE 115-a in such cases may not measure, or may perform a reduced amount of measuring, of CSI-RS transmissions, which may reduce the processing load at the UE 115-a and also reduce measurement transmissions from the UE 115-a.

In some examples, initiating, at a UE, measurements of received reference signals that are to be transmitted in a plurality of downlink transmission beams from a base station, measuring, responsive to the initiating, one or more parameters of each of the received reference signals to generate a plurality of sets of measured beam parameters each associated with a corresponding downlink transmission beam, reporting to the base station, each of the plurality of sets of measured beam parameters, receiving, responsive to the reporting the plurality of sets of measured beam parameters, a plurality of TCI states for use in deterministically receiving a subsequent plurality of sequential transmission beams from the base station, and storing, at the UE, the plurality of TCI states may provide advantages to wireless communications. For example, such a communication protocol may reduce overall signaling overhead (e.g., reduce resources such as CSI-RI signaling for beam tracking) while still providing position specific beam tracking parameters, for example, in cases where a UE is subject to repetitive or periodic changes in position. In some cases, the measurements may include periodic or semi-periodic measurements of received reference signals.

In some cases, receiving, from the base station, a second indication that the base station is starting transmission of the plurality of sequential transmission beams and applying the plurality of TCI states in a deterministic manner to generate receive beamforming parameters for use in receiving each transmission beam of the plurality of sequential transmission beams may allow a UE that is subject to repetitive movements utilize beamforming parameters that are determined for various position of the UE throughout a movement cycle. Thus, reducing signaling between a bases station and UE for configuring beamforming parameters.

In some cases, using the plurality of TCI states to receive two or more subsequent transmission beams from the base station, and measuring a tracking reference signal (TRS) associated with the two or more subsequent transmission beams for beam tracking and channel quality information feedback may facilitate beam refinement or help detect beam failure without need the spatial aspects of beam management needing to be repeated. Accordingly, beam refinements or error detection may occur when deterministic beam TCI are used, thereby reducing overall signaling while maintaining beamforming quality.

While the various examples provided herein refer to downlink transmissions from a base station 105 to a UE 115, techniques as discussed herein may be applied to uplink transmissions as well (e.g., a UE 115 may use a sequence of TCI states to determine uplink beamforming parameters for an uplink transmission beam transmission to a base station 105). Furthermore, techniques as discussed herein may be used in other systems that do not employ beamforming or to other non-beamforming parameters, in which a sequence of parameters may be applied to a series of transmissions (e.g., a sequence of interference parameters may be applied to consecutive TTIs). Examples of transmissions during the RecordMode phase and the RecordPlay phase are discussed with respect to FIGS. 3 and 4, respectively.

Figure 3:
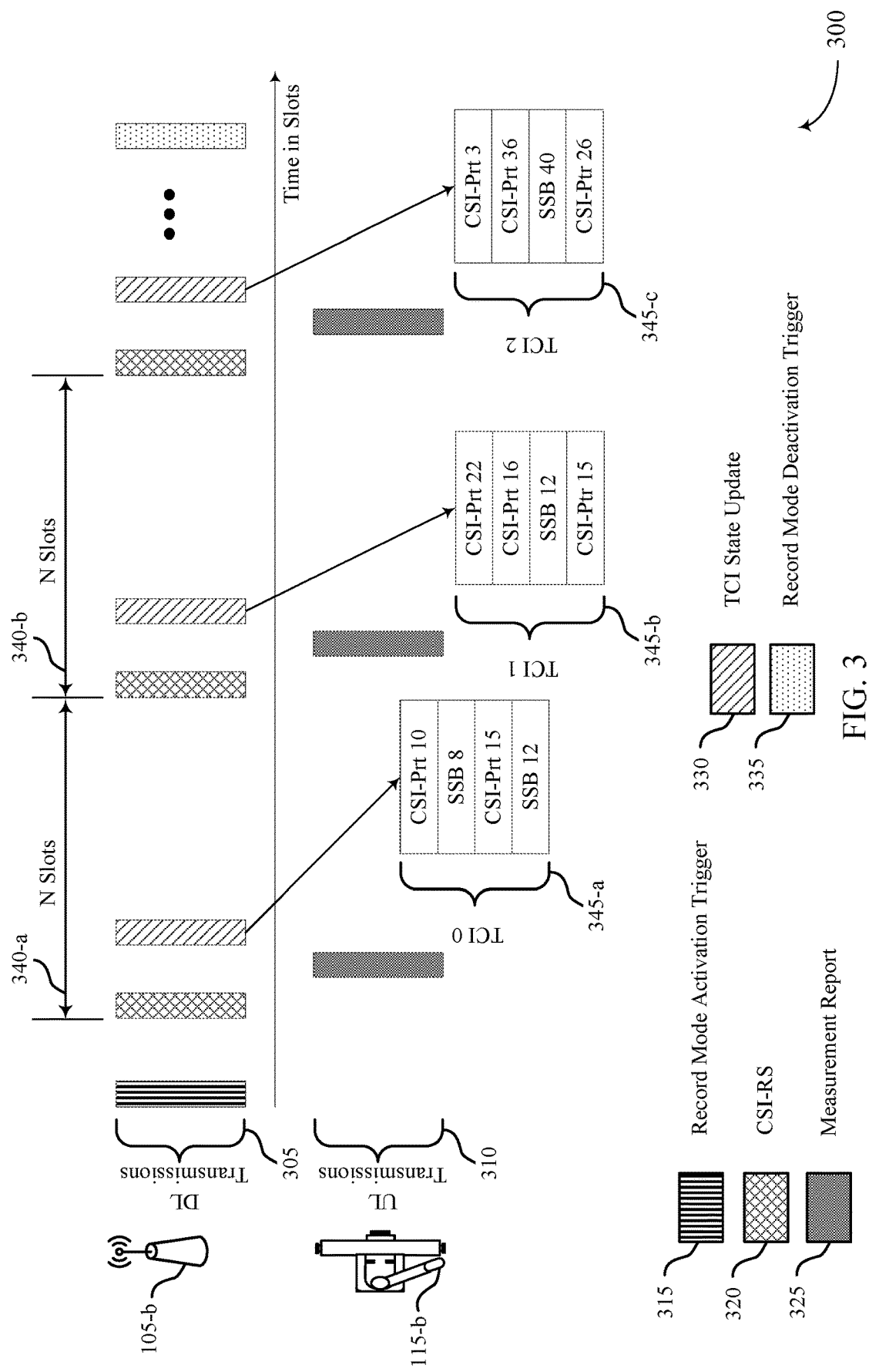
FIG. 3 illustrates an example of a beam tracking procedure that supports beam tracking for periodic user equipment movement in accordance with aspects of the present disclosure.

FIG. 3 illustrates an example of a beam tracking procedure 300 that supports beam tracking for periodic user equipment movement in accordance with various aspects of the present disclosure. In some examples, beam tracking procedure 300 may be implemented in aspects of wireless communication system 100 or 200. In the example of FIG. 3, a base station 105-*b* may transmit downlink transmissions 305 to a UE 115-*b*. Likewise, UE 115-*b* may transmit uplink transmissions 310 to the base station 105-*b*. Base station 105-*b* may be an example of base stations 105 of FIG. 1 or 2, and UE 115-*b*, which may be an example of UEs 115 of FIG. 1 or 2.

In this example, the UE 115-*b* may be subject to repetitive movements that may result in different transmission beams being used during the course of the movement of the UE 115-*b*. In order to use the repetitive motion for beam management, a RecordMode activation trigger 315 may active the transmission and storage of different TCI states associated with the repetitive motion. In some cases, the RecordMode activation trigger 315 may be transmitted by the base station 105-*b* in a downlink transmission to the UE 115-*b* such that both devices initiate the procedure at the same time. In some cases, the RecordMode activation trigger 315 may be transmitted in radio resource control (RRC) signaling, in a MAC control element (MAC-CE), or in downlink control information (DCI), to the UE 115-*b*. In some cases, the base station 105-*b* may determine to perform the RecordMode procedure based on an analysis of beamforming parameters used for communications to the UE 115-*b* that may show that a repetitive pattern of parameters is present. In other cases, the base station 105-*b* and UE 115-*b* may be configured to perform the RecordMode procedure based on a deployment configuration in a wireless communication network (e.g., based on an industrial IoT deployment).

In some cases, the base station 105-*b* may provide a number of parameters associated with the RecordMode procedure to the UE 115-*a*, such as a time period 340 (e.g., N slots) for transmissions of a CSI-RS 320, resources for CSI-RS 320 transmissions, and resources for measurement report 325 transmissions from the UE 115-*b*. For example, the base station 105-*b* may configure the UE 115-*b* to measure CSI-RS 320 transmissions once every 20 slots for 1000 slots or until the base station 105-*b* transmits a RecordMode deactivation trigger 335. In the example of FIG. 3, the base station 105-*b* may transmit a CSI-RS 320 in first slot within a first time period 340-*a* and may transmit a CSI-RS 320 in a corresponding slot within a second time period 340-*b*. The UE 115-*b* may measure one or more parameters associated with the CSI-RS 320, and may transmit a measurement report 325 to the base station 105-*b*. Such measurements may be performed in accordance with one or more beam refinement procedure (e.g., P1/P2/P3 beam selection and refinement procedures used in NR systems). The base station 105-*b* may transmit a TCI state update 330 based on the measurements reported from the UE 115-*b*, which may be stored at both the UE 115-*b* and the base station 105-*b* for use in subsequent transmissions.

In this example, the TCI state updates 330 may include a table of TCI states 345, which may include information on CSI antenna ports for a transmission beam, synchronization signal blocks (SSBs) for a transmission beam, one or more other parameters, or combinations thereof. Such information may be used to determine beamforming parameters (e.g., a set of analog antenna weight configurations for each TCI state) for a particular transmission beam. In some cases, the base station 105-*b* may update the TCI states and also update a mapping of M TCI states to an N Bit DCI that may identify the TCI states. In some cases, each TCI state may have an associated identification (ID), and the UE 115-*b* may store a list of IDs for each slot or other time period. Further, in some cases, the TCI states may include a first subset of TCI states for control resource set (CORESET) transmission beams and a second subset of TCI states for data (e.g., physical downlink control channel (PDSCH)) transmission beams. In some cases, the base station 105-*b* may select the duration of time period 340, the number of time periods 340, of any combination thereof, to account for the number of records that the UE 115-*b* can store. In some cases, the number of records that the UE 115-*b* can store may be determined based on a capability of the UE 115-*b* that may be signaled before activating the RecordMode operation.

The UE 115-*b* may continue to store the TCI states received from the base station 105-*b* until a RecordMode deactivation trigger 335. In some cases, the RecordMode deactivation trigger 335 may be transmitted to the UE 115-*b* by the base station 105-*b* (e.g., via a DCI indication to the UE 115-*b*). In other cases, a timer may be used and the RecordMode deactivated upon the expiration of the timer. Additionally or alternatively, the UE 115-*b* may continue to store the TCI state updates 330 until a number of TCI states received reaches a maximum number of TCI states that the UE 115-*b* is able to store. Following the RecordMode deactivation trigger 335, or timer expiration, the base station 105-*b* and the UE 115-*b* may have a sequence of TCI states 345 stored, which may then be used to deterministically identify beamforming parameters during subsequent transmissions where the UE 115-*b* is undergoing the repetitive movement, an example of which is discussed with respect to FIG. 4.

Figure 4:
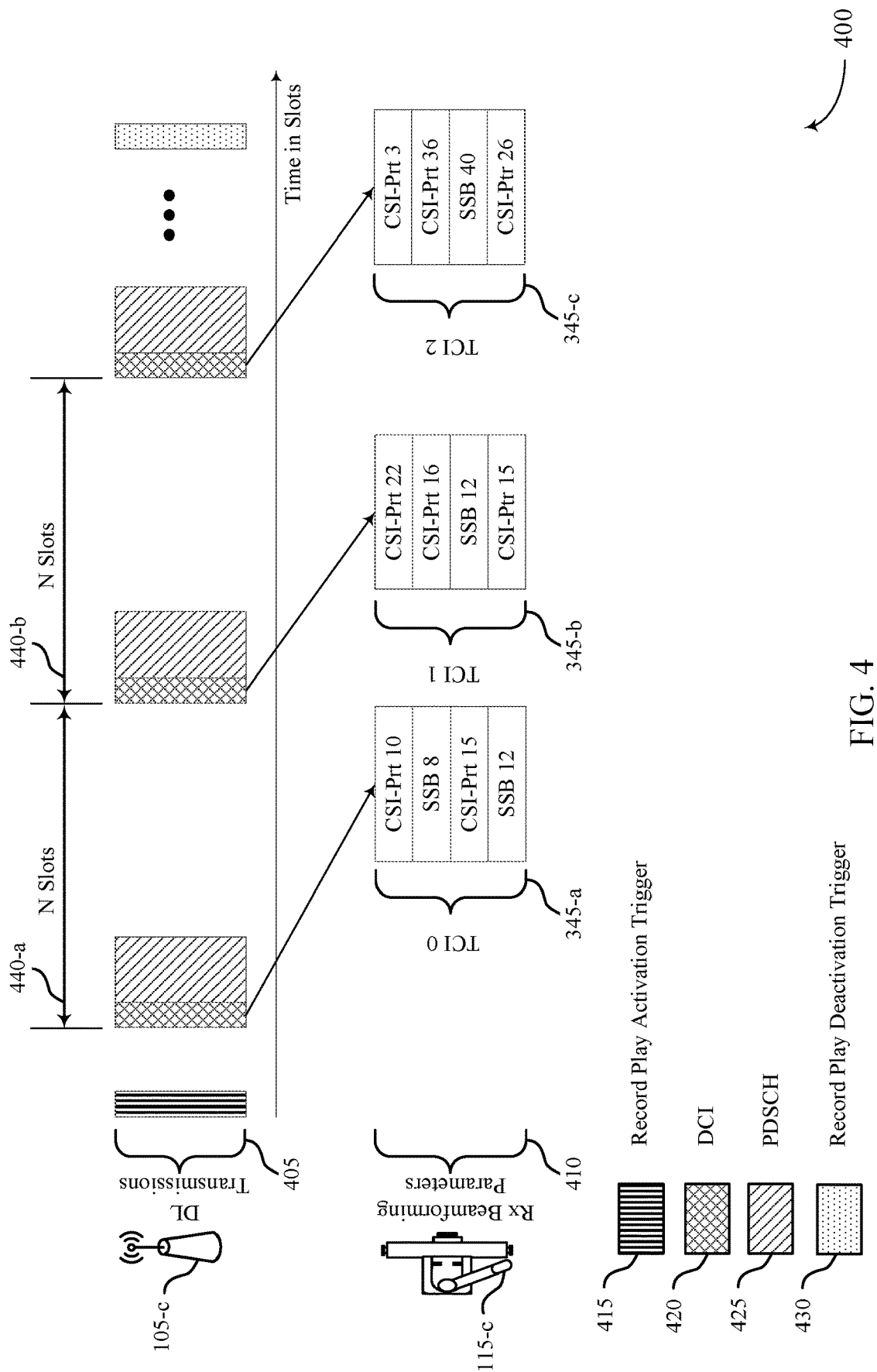
FIG. 4 illustrates an example of a beam tracking procedure that supports beam tracking for periodic user equipment movement in accordance with aspects of the present disclosure.

FIG. 4 illustrates an example of a beam tracking procedure 400 that supports beam tracking for periodic user equipment movement in accordance with various aspects of the present disclosure. In some examples, beam tracking procedure 400 may be implemented in aspects of wireless communication system 100 or 200. In the example of FIG. 4, a base station 105-*c* may transmit downlink transmissions 405 to a UE 115-*c*, in which beamforming parameters for at least a portion of the downlink transmissions 405 are deterministically identified based on the stored TCI states as discussed above. Base station 105-*b* may be an example of base stations 105 of FIG. 1, 2, or 3, and UE 115-*b*, which may be an example of UEs 115 of FIG. 1, 2, or 3.

In this example, after Recording of TCI states during the RecordMode, such as discussed above with respect to FIG. 3, the base station 105-*c* may transmit a RecordPlay activation trigger 415. The base station 105-*c*, in some cases, may activate the RecordPlay mode based on a known periodic movement of the UE 115-*c*, based on one or more measured channel characteristics associated with the UE 115-*c* (e.g., an identification of a start of similar periodic beam transitions as in the RecordMode), based on an indication from the UE 115-*c* to enter RecordPlay mode (e.g., based on a sensor/state based event trigger at the UE 115-*c*), or any combination thereof. In some cases, the UE 115-*c* may be associated with a piece of industrial equipment in an industrial IoT and may be integrated with a programmable logic controller (PLC), and may interpret sensor data or movement data in conjunction with information from the PLC to trigger the RecordPlay mode.

In some cases, the base station 105-*c* may transmit the RecordPlay activation trigger 415 in DCI, a MAC-CE, or in RRC transmissions to the UE 115-*c*. In some cases, the RecordMode procedure as discussed above may be performed for multiple different movement scenarios, and in such cases the RecordPlay activation trigger 415 may include an indication of which TCI states are to be used. In some cases, in addition to the trigger of RecordPlay mode, the base station 105-*c* may also indicate a slot index (from the RecordMode) from which the UE 115-*c* is to obtain the TCI state information. The base station 105-*c*, during a first time period 440-*a*, may transmit DCI 420 to the UE 115-*c*, followed by a PDSCH transmission 425 using beamforming parameters that are determined based on the stored TCI states.

In some cases, a second TCI state for a second time period 440-*b* may be used to determine beamforming parameters for a second transmission beam. Subsequent transmissions from the base station 105-*c* may be transmitted until RecordPlay deactivation trigger 430. Accordingly, beamforming parameters for multiple different transmission beams may be identified without CSI-RS transmissions or measurements. Thus, the base station 105-*c* may reduce the number of CSI-RS resources that it needs to configure for the UE 115-*c*, thereby saving resources. Furthermore, the base station 105-*c* does not need to provide an explicit indication for beamforming or quasi-co-location (QCL) assumptions for CORESET transmissions or PDSCH transmissions over time, as this gets played from memory at both the base station 105-*c* and the UE 115-*c*. In some cases, to receive PDSCH DMRS, the N bit TCI indicator within the DCI 420 may refer to the deterministic table of TCI states 345 for that particular slot.

Using such techniques, spatial aspects of beam management may not need to be repeated when the UE 115-*c* is undergoing the repetitive motion. In such cases, the UE 115-*c* and base station 105-*c* may track non-spatial beam aspects through one or more configured tracking reference signals (TRSs) transmitted in downlink transmissions 405. In some cases, multiple transmission beams may be used concurrently, in which case two or more TRSs may be configured. In such cases, a spatial QCL indication for TRS can be determined based on the TCI states, and the UE 115-*c* may derive delay spread, Doppler spread, and delay/Doppler, etc. from the TRS. In some cases, CQI may be measured, such as through an aperiodic CSI-RS that may be triggered by the base station 105-*c*, in which the CSI-RS is QCL with the corresponding TCI states for a transmission beam. In such cases, even though the UE 115-*c* movement is repetitive and beam change over time can be predicted, the interference may not remain the same and can be measured and reported in CQI. In some cases, the configuration of an aperiodic CSI-RS for CQI, may include one or more zero power (ZP) CSI-RS resources that are configured for interference measurement, which can help in handling non-uniform interference across time.

Additionally or alternatively, for beam failure detection, a number of candidate RS resources may be defined. In some cases, beam failure may be determined based on a TRS in a set of candidate RS resources. Alternatively a CSI-RS may be configured just for beam failure recovery. The UE 115-*c* may measure the RS and trigger beam failure recovery (BFR) if a signal strength of the measured RS falls below threshold. In such cases, after receiving BFR response, the RecordPlay Operation may be automatically terminated. In the absence of beam failure the RecordPlay operation can be terminated by RecordPlay deactivation trigger 430, which may be transmitted in a MAC-CE or DCI, for example.

In some cases, additional beam refinement may be performed when operating in RecordPlay mode. In such cases, the base station 105-*c* may configure a relatively small number of CSI-RS resources (e.g., 3 CSI-RS resources instead of up to 64 resources) that are QCL with the corresponding TCI state. Such CSI-RS resources may be measured by the UE 115-*c*, which may transmit the measurements to the base station 105-*c*, which can update the TCI state based on this information. Thus, if there are some beam imperfections during the RecordMode, they may be corrected through further beam refinement.

Figure 5:
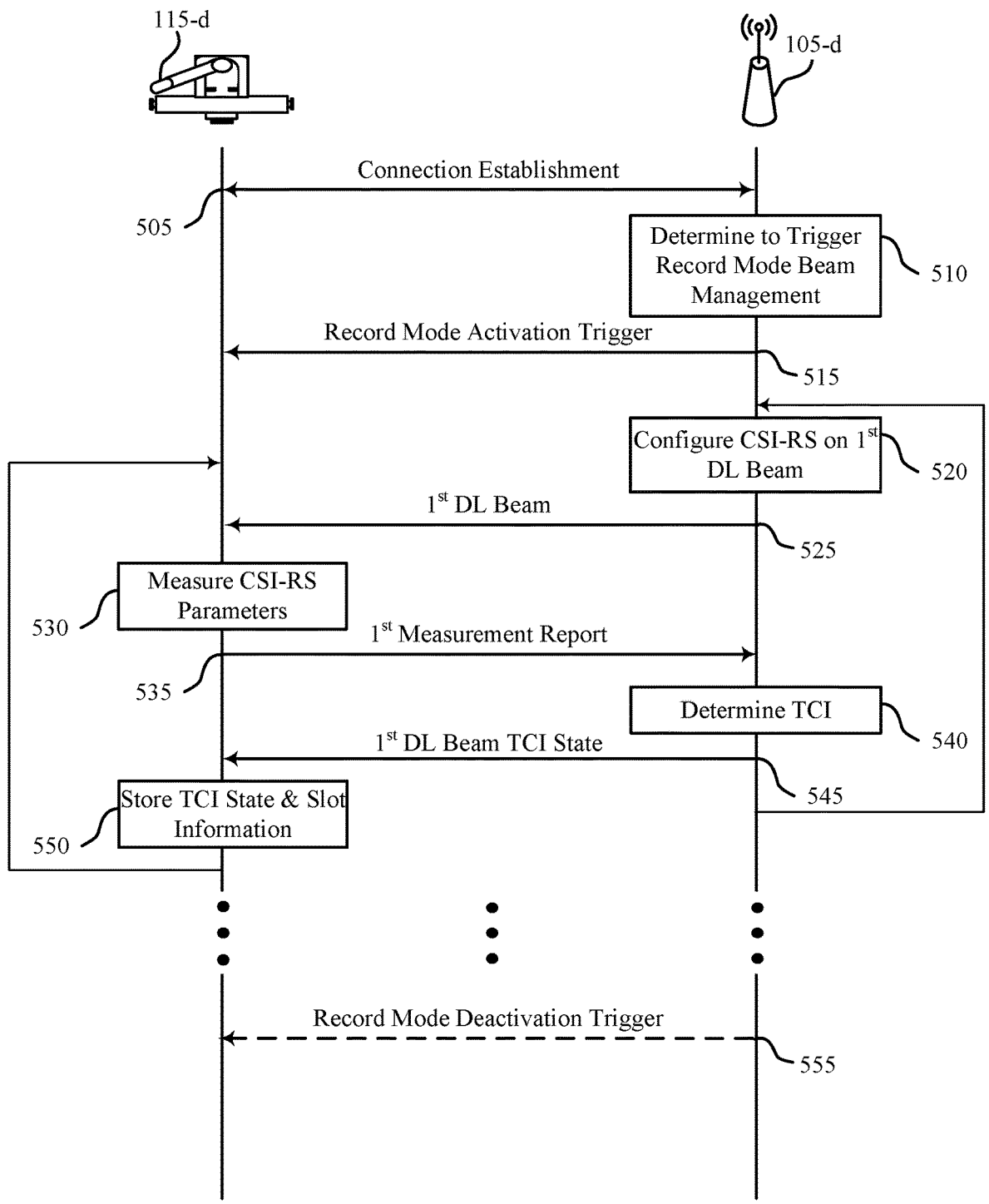
FIG. 5 illustrates an example of a process flow that supports beam tracking for periodic user equipment movement in accordance with aspects of the present disclosure.

FIG. 5 illustrates an example of a process flow 500 that supports beam tracking for periodic user equipment movement in accordance with various aspects of the present disclosure. In some examples, process flow 500 may implement aspects of wireless communication system 100. Process flow 500 may include a base station 105-*d*, and a UE 115-*d*, which may be examples of the corresponding devices described with reference to FIG. 1-4. In this example, base station 105-*d* and UE 115-*d* may establish a connection 505 in accordance with established connection establishment techniques.

At 510, the base station 105-*d* may determine to trigger RecordMode beam management. In some cases, the base station 105-*d* may determine to perform the RecordMode procedure based on an analysis of beamforming parameters used for communications to the UE 115-*d* that may show that a repetitive pattern of parameters is present. In other cases, the base station 105-*d* and UE 115-*d* may be configured to perform the RecordMode procedure based on a deployment configuration in a wireless communication network (e.g., based on an industrial IoT deployment).

The base station 105-*d* may transmit RecordMode activation trigger 515 to the UE 115-*d* to active the RecordMode. In some cases, the RecordMode activation trigger 515 may be transmitted by the base station 105-*d* in a downlink transmission to the UE 115-*d* such that both devices initiate the procedure at the same time. In some cases, the RecordMode activation trigger 515 may be transmitted in RRC signaling, in a MAC-CE, or in DCI, to the UE 115-*d*.

At 520, the base station 105-*d* may configure a CSI-RS on a first downlink beam. The CSI-RS may be configured to allow the UE 115-*d* to measure various parameters of the first downlink beam. In some cases, the CSI-RS use beamforming parameters associated with a CORESET that is configured for the first downlink beam. The base station 105-*d* may then transmit the first downlink beam 525 to the UE 115-*d*.

At 530, the UE 115-*d* may measure CSI-RS parameters from the first downlink beam. The UE 115-*d* may measure, for example, power, phase, and timing parameters based on the CSI-RS, and format the measurements into a first measurement report. The UE 115-*d* may then transmit the first measurement report 535 to the base station 105-*d*.

At 540, the base station 105-*d* may determine a TCI state that is to be configured for the first downlink beam. The first TCI state may be used to determine beamforming parameters for subsequent transmissions using the first downlink beam, in a similar manner as discussed above (e.g., based on CSI antenna ports, SSBs, etc.). The base station 105-*d* may then transmit a first downlink beam TCI state 545 to the UE 115-*d*.

At 550, the UE 115-*d* may store the TCI state and slot information associated with the TCI. The base station 105-*d* and UE 115-*d* may continue in such a manner for a number of CSI-RS transmissions and measurements for a number of subsequent transmission beams, similarly as discussed above, until the RecordMode is complete. In some cases, the base station 105-*d* may transmit a RecordMode deactivation trigger 555 to the UE 115-*d*. In other cases, RecordMode may continue for a configured time period or number of slots.

Figure 6:
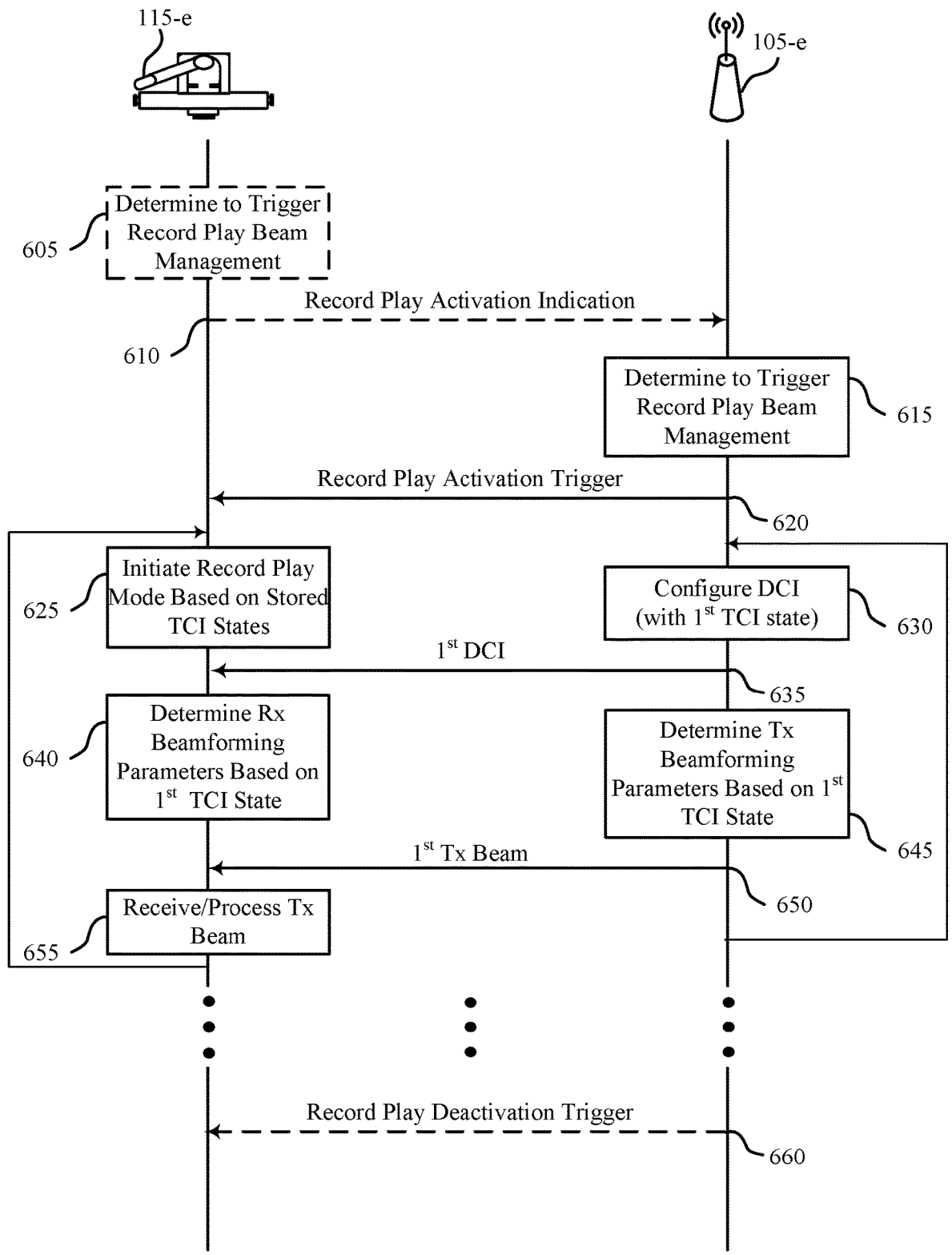
FIG. 6 illustrates an example of a process flow that supports beam tracking for periodic user equipment movement in accordance with aspects of the present disclosure.

FIG. 6 illustrates an example of a process flow 600 that supports beam tracking for periodic user equipment movement in accordance with various aspects of the present disclosure. In some examples, process flow 600 may implement aspects of wireless communication system 100 or 200. Process flow 600 may include a base station 105-*e*, and a UE 115-*e*, which may be examples of the corresponding devices described with reference to FIG. 1-4.

In some cases, as indicated at 605, the UE 115-*e* may optionally determine to trigger the RecordPlay mode for beam management, and may transmit RecordPlay activation indication 610 to the base station 105-*e*. The UE 115-*e* may make such a determination based on, for example, a sensor/state based event trigger. In some cases, the UE 115-*e* may be associated with a piece of industrial equipment in an industrial IoT and may be integrated with a PLC, and may interpret sensor data or movement data in conjunction with information from the PLC to trigger the RecordPlay mode.

At 615, the base station 105-*e* may determine to trigger the RecordPlay mode for beam management. Similarly as discussed above, the base station 105-*e* may make such a determination based on a known periodic movement of the UE 115-*e*, or based on one or more measured channel characteristics associated with the UE 115-*e* (e.g., an identification of a start of similar periodic beam transitions as in the RecordMode). The base station 105-*c* may transmit RecordPlay activation trigger 620 to the UE 115-*e*.

At 625, the UE 115-*e* may initiate the RecordPlay mode based on the stored TCI states from the RecordMode. In some cases, the base station 105-*e* may indicate which TCI states from two or more sets of TCI states are to be used for subsequent transmission beams. In some cases, the RecordPlay activation trigger 620 may provide an indication of a slot at which the RecordPlay operation is to start.

At 630, the base station 105-*e* may configure DCI with a first TCI state. In some cases, the DCI may include an index into a table of available TCI states. In other cases, the DCI may identify a TCI ID. The base station 105-*e* may then transmit the DCI 635 to the UE 115-*e*.

At 640, the UE 115-*e* may determine receive beamforming parameters for a first downlink transmission beam based on the first TCI state. Likewise, at 645, the base station 105-*e* may determine transmit beamforming parameters for the first downlink transmission beam based on the first TCI state. The base station 105-*e* may transmit the first transmission beam 650 using the identified beamforming parameters.

At 655, the UE 115-*e* may receive and process the first transmission beam. As discussed above, the UE 115-*e* may use the indicated TCI state to determine receive beamforming parameters to use for receiving the first transmission beam. The base station 105-*e* and UE 115-*e* may continue in such a manner for a number subsequent downlink transmission beams, similarly as discussed above, until the RecordPlay mode is complete. In some cases, the base station 105-*e* may transmit a RecordPlay deactivation trigger 660 to the UE 115-*e*. In other cases, RecordPlay operations may continue for a configured time period or number of slots.

Figure 7:
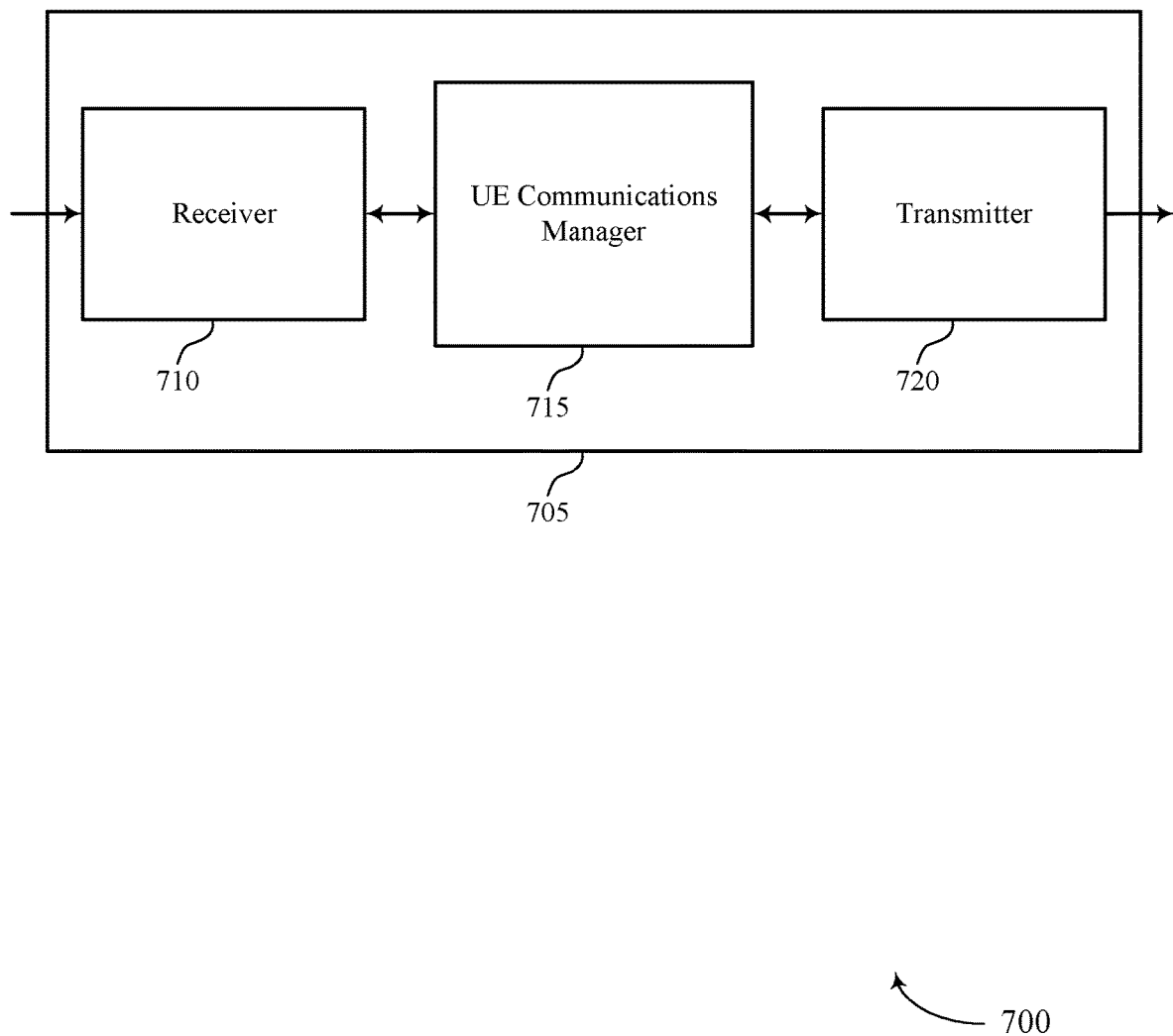
FIGS. 7 through 9 show block diagrams of a device that supports beam tracking for periodic user equipment movement in accordance with aspects of the present disclosure.

FIG. 7 shows a block diagram 700 of a wireless device 705 that supports beam tracking for periodic user equipment movement in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam tracking for periodic user equipment movement, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may initiate measurements of received reference signals that are to be transmitted in a set of downlink transmission beams from a base station, measure, responsive to the initiating, one or more parameters of each of the received reference signals to generate a set of sets of measured beam parameters each associated with a corresponding downlink transmission beam, report each of the multiple sets of measured beam parameters to the base station, receive, responsive to the reporting the multiple sets of measured beam parameters, a set of TCI states for use in deterministically receiving a subsequent set of sequential transmission beams from the base station, and store the set of TCI states. In some cases, the measurements may include periodic or semi-periodic measurements of received reference signals.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
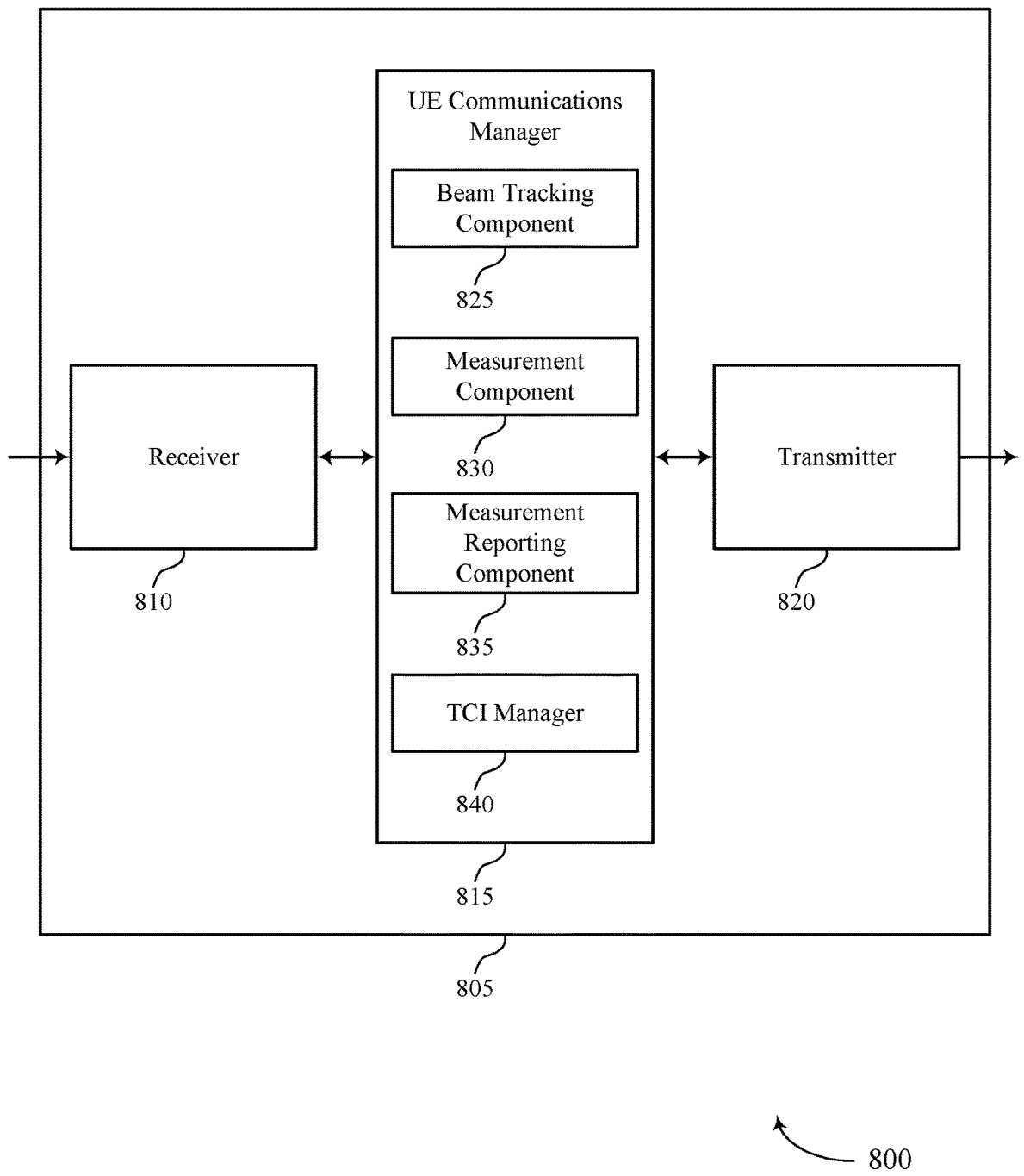

FIG. 8 shows a block diagram 800 of a wireless device 805 that supports beam tracking for periodic user equipment movement in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam tracking for periodic user equipment movement, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include beam tracking component 825, measurement component 830, measurement reporting component 835, and TCI manager 840.

Beam tracking component 825 may initiate measurements of received reference signals that are to be transmitted in a set of downlink transmission beams from a base station. In some cases, beam tracking component 825 may and receive a trigger indication from the base station to initiate the measurements of received reference signals. In some cases, the trigger indication is received in RRC signaling, a MAC control element, in DCI, or any combination thereof. In some cases, the measuring one or more parameters of each of a set of reference signals is performed as part of a beam selection procedure, a beam refinement procedure, or any combinations thereof. In some cases, the measurements may include periodic or semi-periodic measurements of received reference signals.

Measurement component 830 may measure, responsive to the initiating, one or more parameters of each of the received reference signals to generate a set of measured beam parameters each associated with a corresponding downlink transmission beam. In some cases, measurement component 830 may measure a first reference signal in a first transmission slot, measure one or more subsequent reference signals in one or more subsequent transmission slots, each of the one or more subsequent transmission slots being at predetermined intervals. In some cases, measurement component 830 may measure a TRS associated with the two or more subsequent transmission beams for beam tracking and channel quality information feedback. In some cases, measurement component 830 may receive a trigger for an aperiodic CSI-RS measurement from the base station, receive the CSI-RS using a TCI state selected from the set of TCI states, measure one or more channel quality parameters based on the CSI-RS, and transmit the measured one or more channel quality parameters to the base station.

Measurement reporting component 835 may report each of the sets of measured beam parameters to the base station.

TCI manager 840 may receive, responsive to the reporting the measurement parameters, a set of TCI states for use in deterministically receiving a subsequent set of sequential transmission beams from the base station. In some cases, TCI manager 840 may receive one or more TCI states based on the measured one or more channel quality parameters. In some cases, TCI manager 840 may receive, from the base station, a second indication that the base station is starting transmission of the set of sequential transmission beams, and apply the set of TCI states in a deterministic manner to generate receive beamforming parameters for use in receiving each transmission beam of the set of sequential transmission beams. In some cases, TCI manager 840 may store the set of TCI states, and repeat the measuring, the reporting, and the receiving until a deactivation of the measurements of received reference signals.

In some cases, TCI manager 840 may determine that a repetitive order of transmission beam parameters corresponding to the set of TCI states is occurring, and transmit a signal to the base station to initiate using the set of TCI states to receive one or more subsequent transmission beams from the base station. In some cases, the second indication is received in a DCI transmission from the base station, in a MAC control element from the base station, in radio resource control signaling from the base station, or any combination thereof. In some cases, the applying the TCI states includes identifying a first TCI state of the set of TCI states for a first transmission beam of the set of sequential transmission beams, and identifying subsequent TCI states of the set of TCI states for remaining transmission beams of the set of sequential transmission beams based on the first TCI state and subsequent deterministic TCI states that follow the first TCI state. In some cases, the set of TCI states includes a first subset of TCI states for receiving control resource set transmission beams and a second subset TCI states for receiving physical downlink shared channel (PDSCH) transmission beams. In some cases, the deactivation corresponds to an expiration of a timer associated with the measurements of received reference signals or a receipt of a deactivation indication from the base station. In some cases, the identifying the subsequent TCI states is performed independently of signaling from the base station. In some cases, the measurements of received references signals may include periodic or semi-periodic measurements.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
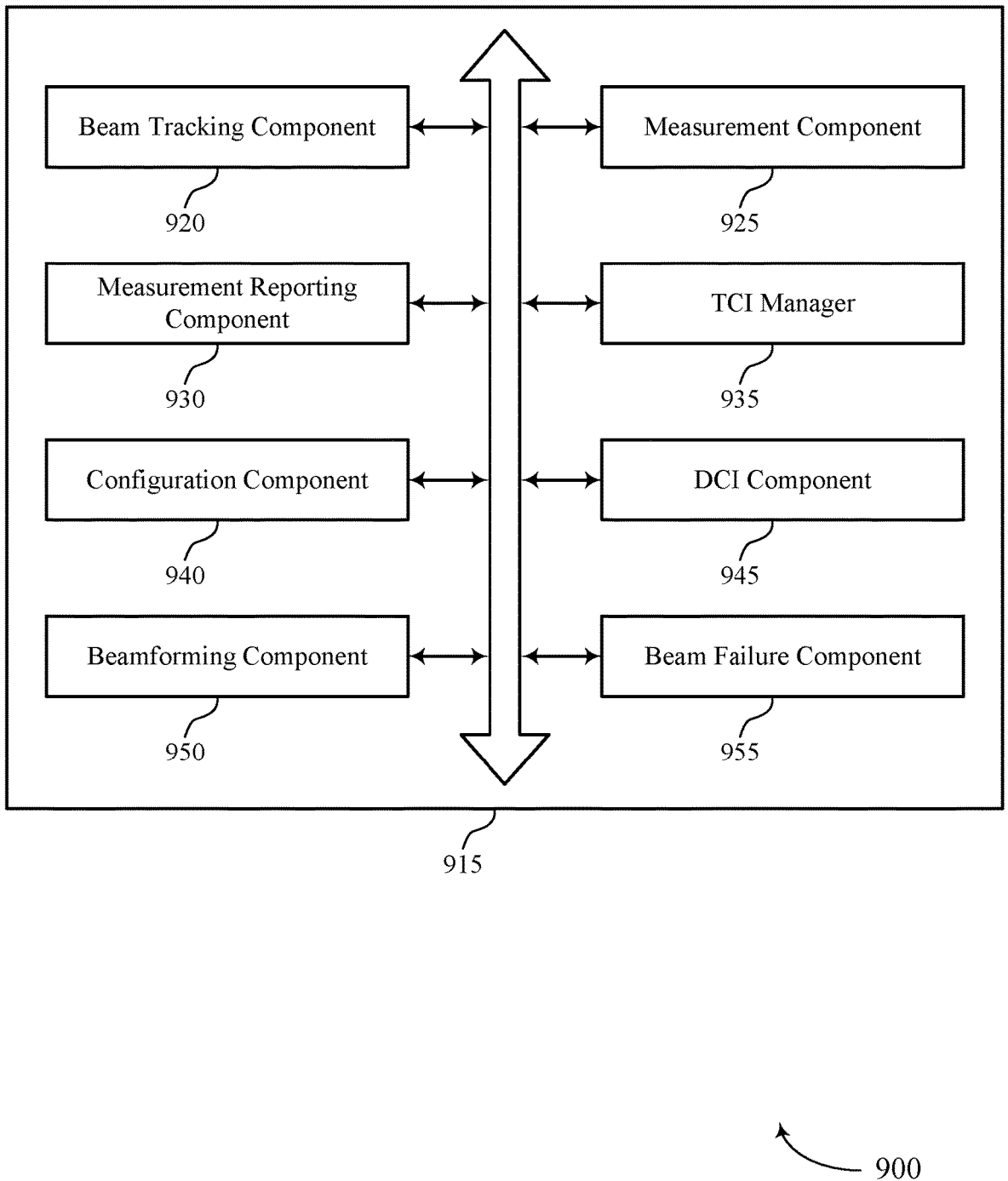

FIG. 9 shows a block diagram 900 of a UE communications manager 915 that supports beam tracking for periodic user equipment movement in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include beam tracking component 920, measurement component 925, measurement reporting component 930, TCI manager 935, configuration component 940, DCI component 945, beamforming component 950, and beam failure component 955. Each of these modules may communicate, directly or indirectly, with one another (e.g., via one or more buses).

Beam tracking component 920 may initiate measurements of received reference signals that are to be transmitted in a set of downlink transmission beams from a base station. In some cases, beam tracking component 920 may and receive a trigger indication from the base station to initiate the measurements of received reference signals. In some cases, the trigger indication is received in RRC signaling, a MAC control element, in DCI, or any combination thereof. In some cases, the measuring one or more parameters of each of a set of reference signals is performed as part of a beam selection procedure, a beam refinement procedure, or any combinations thereof. In some cases, the measurements may include periodic or semi-periodic measurements of received reference signals.

Measurement component 925 may measure, responsive to the initiating, one or more parameters of each of the received reference signals to generate a set of measured beam parameters each associated with a corresponding downlink transmission beam. In some cases, measurement component 925 may measure a first reference signal in a first transmission slot, measure one or more subsequent reference signals in one or more subsequent transmission slots, each of the one or more subsequent transmission slots being at predetermined intervals. In some cases, measurement component 925 may measure a TRS associated with the two or more subsequent transmission beams for beam tracking and channel quality information feedback. In some cases, measurement component 925 may receive a trigger for an aperiodic CSI-RS measurement from the base station, receive the CSI-RS using a TCI state selected from the set of TCI states, measure one or more channel quality parameters based on the CSI-RS, and transmit the measured one or more channel quality parameters to the base station.

Measurement reporting component 930 may report each of the multiple sets of measured beam parameters to the base station.

TCI manager 935 may receive, responsive to the reporting the measurement parameters, a set of TCI states for use in deterministically receiving a subsequent set of sequential transmission beams from the base station. In some cases, TCI manager 935 may receive one or more TCI states based on the measured one or more channel quality parameters. In some cases, TCI manager 935 may receive, from the base station, a second indication that the base station is starting transmission of the set of sequential transmission beams, and apply the set of TCI states in a deterministic manner to generate receive beamforming parameters for use in receiving each transmission beam of the set of sequential transmission beams. In some cases, TCI manager 935 may store the set of TCI states, and repeat the measuring, the reporting, and the receiving until a deactivation of the measurements of received reference signals.

In some cases, TCI manager 935 may determine that a repetitive order of transmission beam parameters corresponding to the set of TCI states is occurring, and transmit a signal to the base station to initiate using the set of TCI states to receive one or more subsequent transmission beams from the base station. In some cases, the second indication is received in a DCI transmission from the base station, in a MAC control element from the base station, in radio resource control signaling from the base station, or any combination thereof. In some cases, the applying the TCI states includes identifying a first TCI state of the set of TCI states for a first transmission beam of the set of sequential transmission beams, and identifying subsequent TCI states of the set of TCI states for remaining transmission beams of the set of sequential transmission beams based on the first TCI state and subsequent deterministic TCI states that follow the first TCI state. In some cases, the set of TCI states includes a first subset of TCI states for receiving control resource set transmission beams and a second subset TCI states for receiving PDSCH transmission beams. In some cases, the deactivation corresponds to an expiration of a timer associated with the measurements of received reference signals or a receipt of a deactivation indication from the base station. In some cases, the identifying the subsequent TCI states is performed independently of signaling from the base station. In some cases, the measurements may include periodic or semi-periodic measurements of received reference signals.

Configuration component 940 may receive configuration information from the base station, or may identify one or more configuration parameters based on a UE capability. In some cases, the predetermined intervals for CSI-RS measurements, number of predetermined intervals, or any combination thereof, are configured at the UE by the base station.

DCI component 945 may receive an indication of a first TCI state from the table of TCI states that is to be used in receiving a first transmission beam of the set of sequential transmission beams.

Beamforming component 950 may receive the first transmission beam using receive beamforming parameters that are based on the first TCI state and use the set of TCI states to receive two or more subsequent transmission beams from the base station. In some cases, the UE stores a set of analog beamforming weight configurations that each have an associated ID, and where each TCI state of the set of TCI states indicates an ID for one of the set of analog beamforming weight configurations. In some cases, the one or more beamforming parameters for the TRS are determined based on the set of TCI states.

Beam failure component 955 may receive one or more subsequent transmissions from the base station using one or more of the set of TCI states, measure one or more channel quality characteristics of the one or more subsequent transmissions, and determine a beam failure based at least on part on one or more of the channel quality characteristics being below a threshold.

Figure 10:
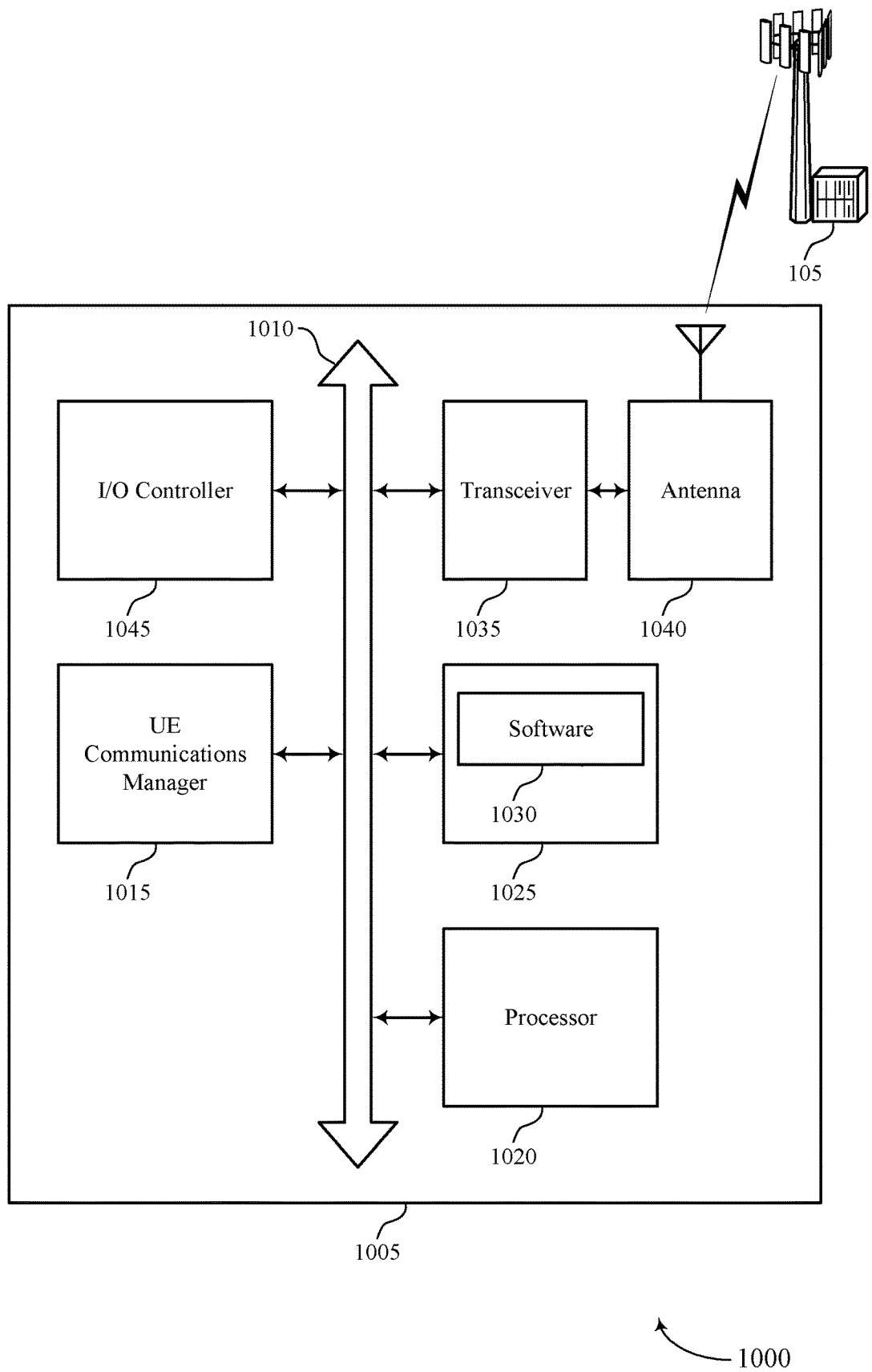
FIG. 10 illustrates a block diagram of a system including a UE that supports beam tracking for periodic user equipment movement in accordance with aspects of the present disclosure.

FIG. 10 shows a diagram of a system 1000 including a device 1005 that supports beam tracking for periodic user equipment movement in accordance with aspects of the present disclosure. Device 1005 may be an example of or include the components of wireless device 705, wireless device 805, or a UE 115 as described herein, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting beam tracking for periodic user equipment movement).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support beam tracking for periodic user equipment movement. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
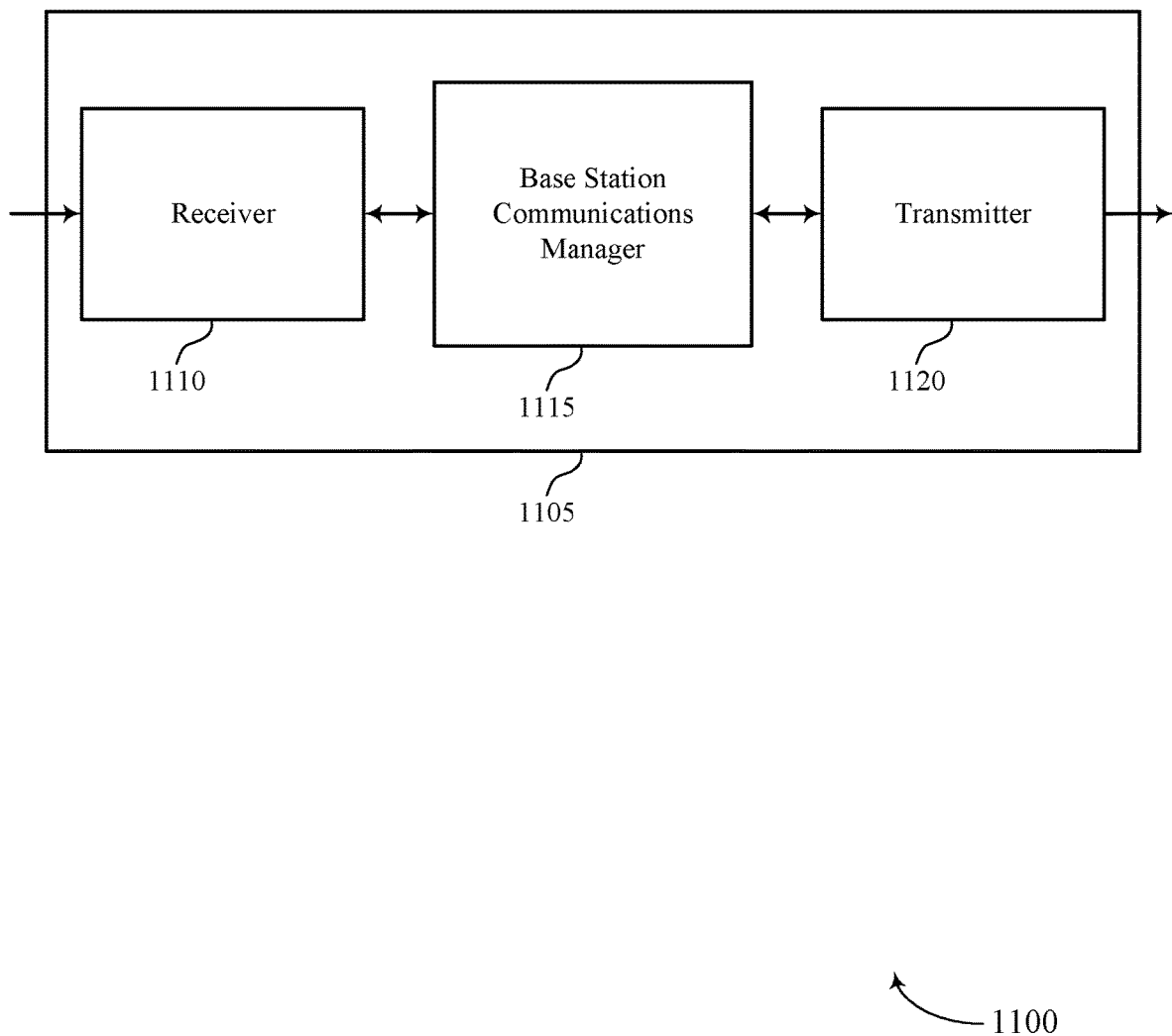
FIGS. 11 through 13 show block diagrams of a device that supports beam tracking for periodic user equipment movement in accordance with aspects of the present disclosure.

FIG. 11 shows a block diagram 1100 of a wireless device 1105 that supports beam tracking for periodic user equipment movement in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam tracking for periodic user equipment movement, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit an indication to a UE to initiate measurements of periodically transmitted reference signals that are to be transmitted in a set of downlink transmission beams from the base station, transmit a set of reference signals to the UE via the set of downlink transmission beams, each successive reference signal of the set of reference signals transmitted at predetermined time period following a prior reference signal transmission, receive, from the UE, one or more parameters of associated with each of the set of reference signals, determine a set of TCI states for use in deterministically transmitting a subsequent set of sequential transmission beams to the UE, store, at the base station, the set of TCI states, and transmit the set of TCI states to the UE. In some cases, the measurements may include periodic or semi-periodic measurements of received reference signals.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
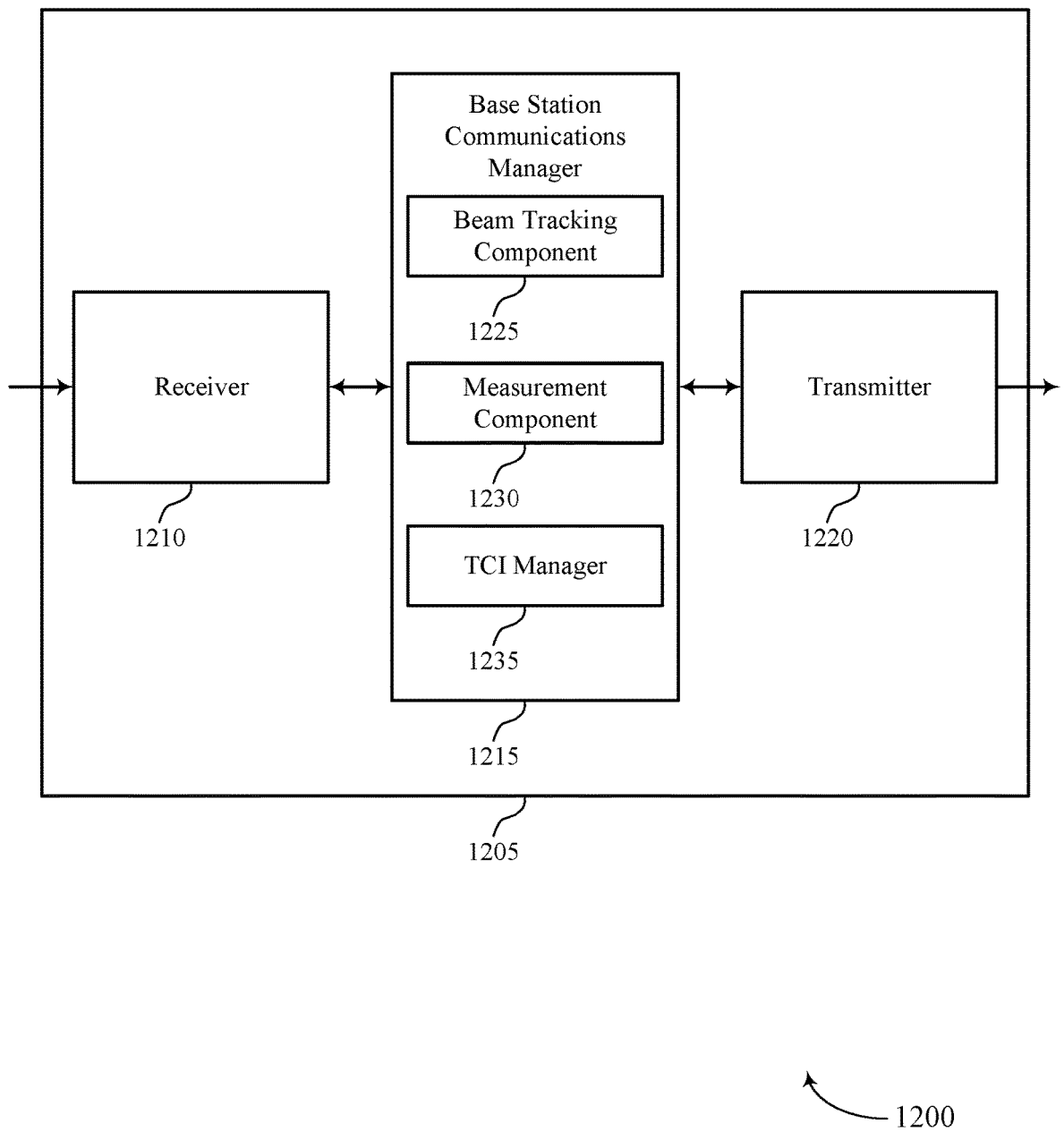

FIG. 12 shows a block diagram 1200 of a wireless device 1205 that supports beam tracking for periodic user equipment movement in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to beam tracking for periodic user equipment movement, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include beam tracking component 1225, measurement component 1230, and TCI manager 1235.

Beam tracking component 1225 may transmit an indication to a UE to initiate measurements of periodically transmitted reference signals that are to be transmitted in a set of downlink transmission beams from the base station, and transmit a set of reference signals to the UE via the set of downlink transmission beams, each successive reference signal of the set of reference signals transmitted at predetermined time period following a prior reference signal transmission. In some cases, beam tracking component 1225 may transmit a first reference signal via a first transmission beam in a first transmission slot, transmit one or more subsequent reference signals via one or more subsequent transmission beams in one or more subsequent transmission slots, each of the one or more subsequent transmission slots being at predetermined intervals. In some cases, beam tracking component 1225 may transmit a trigger indication to the UE to initiate the measurements of the periodically transmitted reference signals, and perform a beam refinement procedure based on the received one or more measured channel quality parameters. In some cases, the trigger indication is transmitted in RRC signaling, a MAC control element, in DCI, or any combination thereof. In some cases, the measurements may include periodic or semi-periodic measurements of received reference signals.

Measurement component 1230 may receive, from the UE, one or more parameters of associated with each of the set of reference signals, configure the UE to measure the reference signals at the predetermined intervals, transmit a trigger for an aperiodic CSI-RS measurement by the UE, and receive one or more measured channel quality parameters from the UE.

TCI manager 1235 may determine a set of TCI states for use in deterministically transmitting a subsequent set of sequential transmission beams to the UE, store the set of TCI states, and transmit the set of TCI states to the UE. In some cases, TCI manager 1235 may transmit, to the UE, a second indication that the base station is starting transmission of the set of sequential transmission beams, and apply the set TCI states in a deterministic manner to generate transmit beamforming parameters for use in transmitting each transmission beam of the set of sequential transmission beams.

In some cases, TCI manager 1235 may determine that a repetitive order of transmission beam parameters corresponding to the set of TCI states is occurring, transmit a signal to the base station to initiate using the set TCI states to receive one or more subsequent transmission beams from the base station, and use the set of TCI states for transmitting two or more subsequent transmission beams to the UE. In some cases, TCI manager 1235 may update one or more of the TCI states based on the beam refinement procedure, and transmit the one or more updated TCI states to the UE. In some cases, the set of TCI states includes a first subset of TCI states for transmitting control resource set transmission beams and a second subset TCI states for transmitting PDSCH transmission beams. In some cases, the second indication is transmitted in a DCI transmission, in a MAC control element, in radio resource control signaling, or any combination thereof. In some cases, the applying the TCI states includes identifying a first TCI state of the set of TCI states for a first transmission beam of the set of sequential transmission beams, and identifying subsequent TCI states of the set of TCI states for remaining transmission beams of the set of sequential transmission beams based on the first TCI state and subsequent deterministic TCI states that follow the first TCI state.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
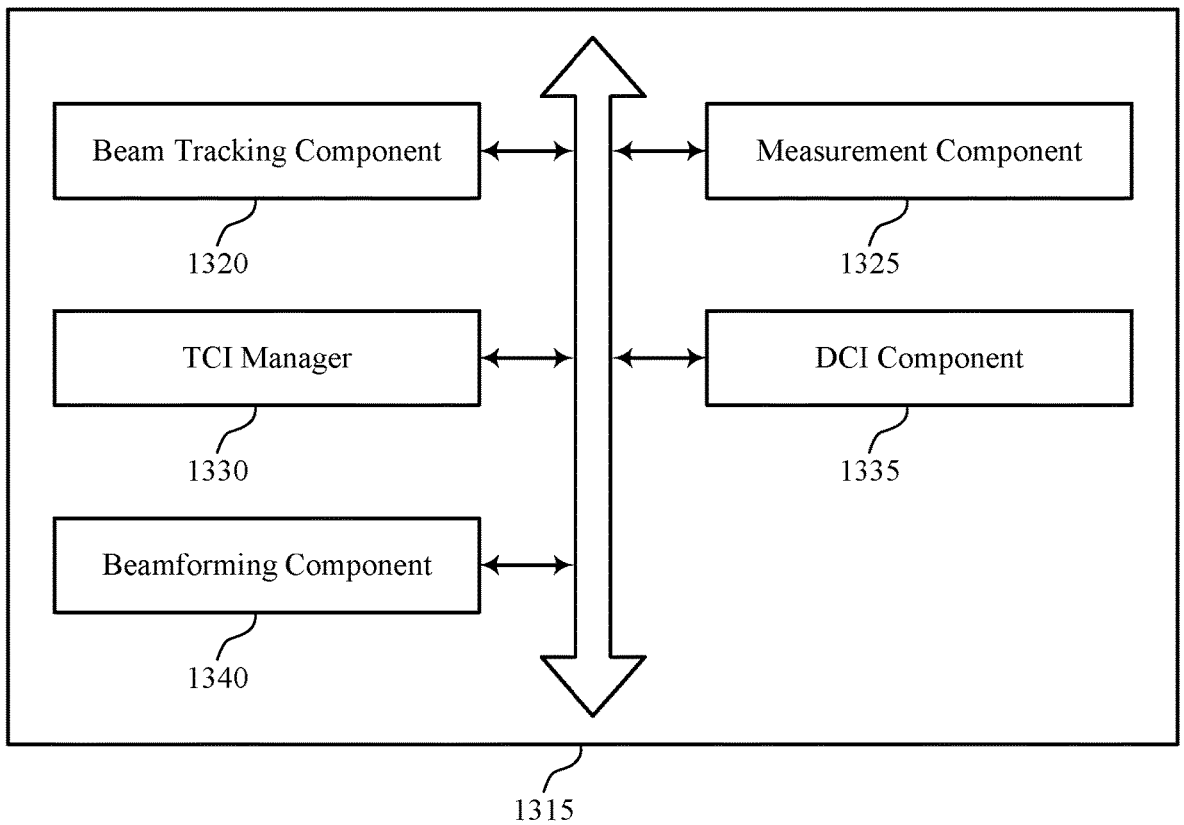

FIG. 13 shows a block diagram 1300 of a base station communications manager 1315 that supports beam tracking for periodic user equipment movement in accordance with aspects of the present disclosure. The base station communications manager 1315 may be an example of aspects of a base station communications manager 1415 described with reference to FIGS. 11, 12, and 14. The base station communications manager 1315 may include beam tracking component 1320, measurement component 1325, TCI manager 1330, DCI component 1335, and beamforming component 1340. Each of these modules may communicate, directly or indirectly, with one another (e.g., via one or more buses).

Beam tracking component 1320 may transmit an indication to a UE to initiate measurements of periodically transmitted reference signals that are to be transmitted in a set of downlink transmission beams from the base station, and transmit a set of reference signals to the UE via the set of downlink transmission beams, each successive reference signal of the set of reference signals transmitted at predetermined time period following a prior reference signal transmission. In some cases, beam tracking component 1320 may transmit a first reference signal via a first transmission beam in a first transmission slot, transmit one or more subsequent reference signals via one or more subsequent transmission beams in one or more subsequent transmission slots, each of the one or more subsequent transmission slots being at predetermined intervals. In some cases, beam tracking component 1320 may transmit a trigger indication to the UE to initiate the measurements of the periodically transmitted reference signals, and perform a beam refinement procedure based on the received one or more measured channel quality parameters. In some cases, the trigger indication is transmitted in RRC signaling, a MAC control element, in DCI, or any combination thereof. In some cases, the measurements may include periodic or semi-periodic measurements of received reference signals.

Measurement component 1325 may receive, from the UE, one or more parameters of associated with each of the set of reference signals, configure the UE to measure the reference signals at the predetermined intervals, transmit a trigger for an aperiodic CSI-RS measurement by the UE, and receive one or more measured channel quality parameters from the UE.

TCI manager 1330 may determine a set of TCI states for use in deterministically transmitting a subsequent set of sequential transmission beams to the UE, store the set of TCI states, and transmit the set of TCI states to the UE. In some cases, TCI manager 1330 may transmit, to the UE, a second indication that the base station is starting transmission of the set of sequential transmission beams, and apply the set TCI states in a deterministic manner to generate transmit beamforming parameters for use in transmitting each transmission beam of the set of sequential transmission beams.

In some cases, TCI manager 1330 may determine that a repetitive order of transmission beam parameters corresponding to the set of TCI states is occurring, transmit a signal to the base station to initiate using the set TCI states to receive one or more subsequent transmission beams from the base station, and use the set of TCI states for transmitting two or more subsequent transmission beams to the UE. In some cases, TCI manager 1330 may update one or more of the TCI states based on the beam refinement procedure, and transmit the one or more updated TCI states to the UE. In some cases, the set of TCI states includes a first subset of TCI states for transmitting control resource set transmission beams and a second subset TCI states for transmitting PDSCH transmission beams. In some cases, the second indication is transmitted in a DCI transmission, in a MAC control element, in radio resource control signaling, or any combination thereof. In some cases, the applying the TCI states includes identifying a first TCI state of the set of TCI states for a first transmission beam of the set of sequential transmission beams, and identifying subsequent TCI states of the set of TCI states for remaining transmission beams of the set of sequential transmission beams based on the first TCI state and subsequent deterministic TCI states that follow the first TCI state.

DCI component 1335 may transmit an indication of a first TCI state from the table of TCI states that is to be used by the UE in receiving a first transmission beam.

Beamforming component 1340 may transmit the first transmission beam using beamforming parameters that are based on the first TCI state, and transmit, in each of the two or more subsequent transmission beams. In some cases, beamforming component 1340 may transmit a TRS for beam tracking and channel quality information feedback from the UE. In some cases, beamforming component 1340 may transmit a CSI-RS using a set of transmission beam parameters selected from the set TCI states. In some cases, the base station stores a set of analog beamforming weight configurations that each have an associated ID, and where each TCI state of the set of TCI states indicates an ID for one of the set of analog beamforming weight configurations.

Figure 14:
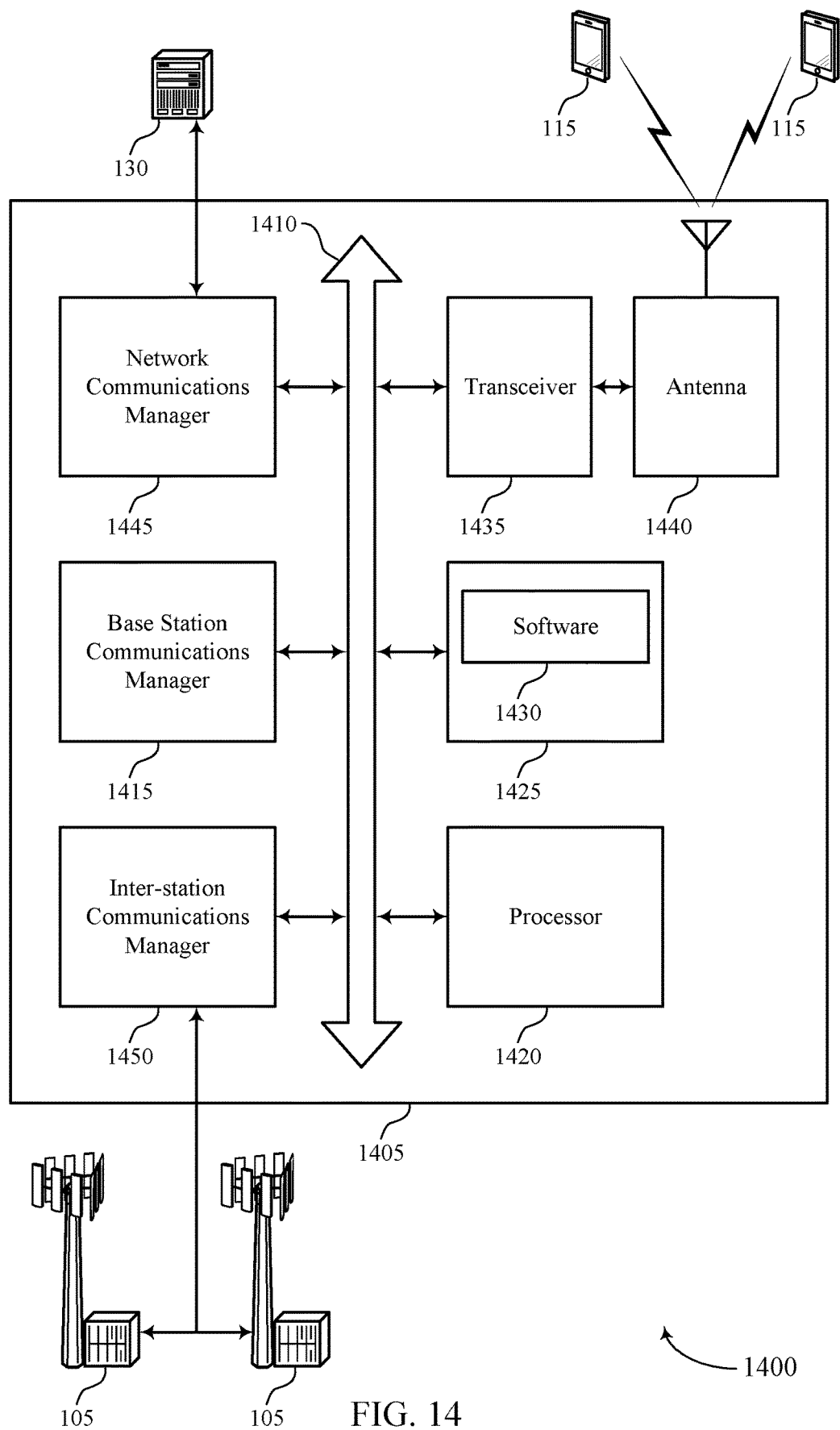
FIG. 14 illustrates a block diagram of a system including a base station that supports beam tracking for periodic user equipment movement in accordance with aspects of the present disclosure.

FIG. 14 shows a diagram of a system 1400 including a device 1405 that supports beam tracking for periodic user equipment movement in accordance with aspects of the present disclosure. Device 1405 may be an example of or include the components of base station 105 as described herein, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting beam tracking for periodic user equipment movement).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support beam tracking for periodic user equipment movement. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
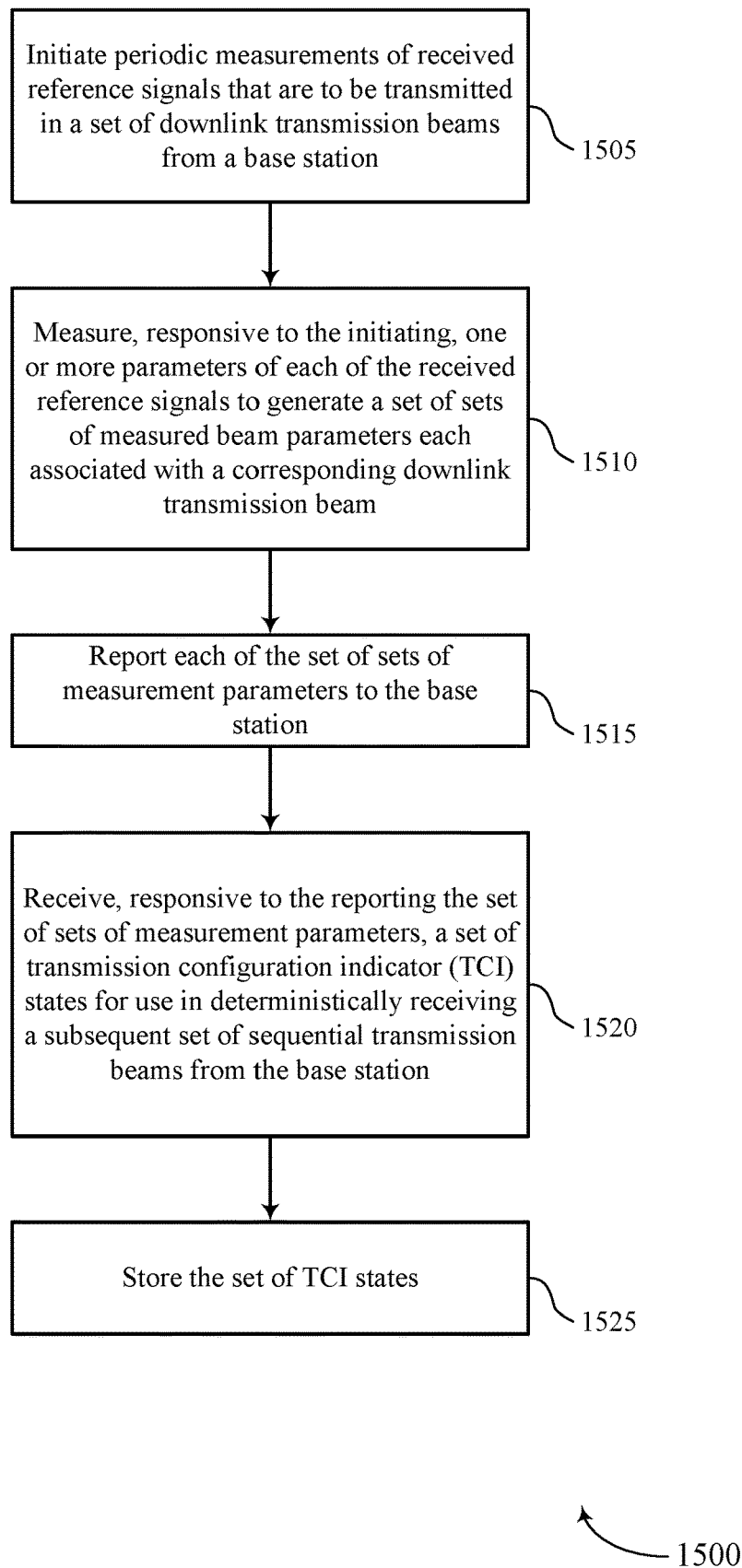
FIGS. 15 through 22 illustrate methods for beam tracking for periodic user equipment movement in accordance with aspects of the present disclosure.

FIG. 15 shows a flowchart illustrating a method 1500 for beam tracking for periodic user equipment movement in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may initiate measurements of received reference signals that are to be transmitted in a plurality of downlink transmission beams from a base station. The operations of 1505 may be performed according to the methods described herein. In certain examples, aspects of the operations of 1505 may be performed by a beam tracking component as described with reference to FIGS. 7 through 10.

At 1510 the UE 115 may measure, responsive to the initiating, one or more parameters of each of the received reference signals to generate a plurality of sets of measured beam parameters each associated with a corresponding downlink transmission beam. The operations of 1510 may be performed according to the methods described herein. In certain examples, aspects of the operations of 1510 may be performed by a measurement component as described with reference to FIGS. 7 through 10.

At 1515 the UE 115 may report each of the plurality of sets of measured beam parameters to the base station. The operations of 1515 may be performed according to the methods described herein. In certain examples, aspects of the operations of 1515 may be performed by a measurement reporting component as described with reference to FIGS. 7 through 10.

At 1520 the UE 115 may receive, responsive to the reporting the plurality of sets of measured beam parameters, a plurality of TCI states for use in deterministically receiving a subsequent plurality of sequential transmission beams from the base station. The operations of 1520 may be performed according to the methods described herein. In certain examples, aspects of the operations of 1520 may be performed by a TCI manager as described with reference to FIGS. 7 through 10.

At 1525 the UE 115 may store the plurality of TCI states. The operations of 1525 may be performed according to the methods described herein. In certain examples, aspects of the operations of 1525 may be performed by a TCI manager as described with reference to FIGS. 7 through 10.

Figure 16:
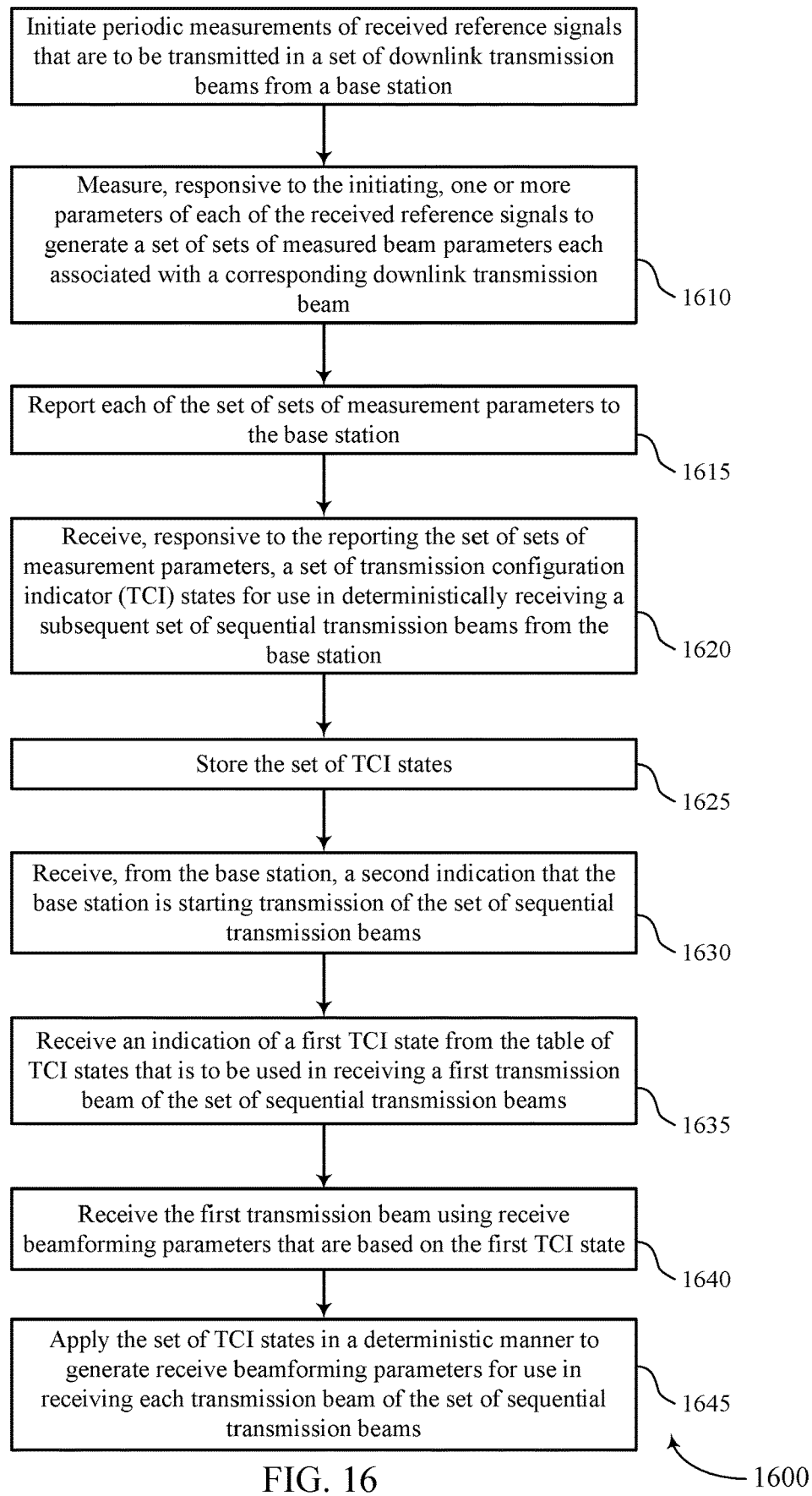

FIG. 16 shows a flowchart illustrating a method 1600 for beam tracking for periodic user equipment movement in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may initiate measurements of received reference signals that are to be transmitted in a plurality of downlink transmission beams from a base station. The operations of 1605 may be performed according to the methods described herein. In certain examples, aspects of the operations of 1605 may be performed by a beam tracking component as described with reference to FIGS. 7 through 10.

At 1610 the UE 115 may measure, responsive to the initiating, one or more parameters of each of the received reference signals to generate a plurality of sets of measured beam parameters each associated with a corresponding downlink transmission beam. The operations of 1610 may be performed according to the methods described herein. In certain examples, aspects of the operations of 1610 may be performed by a measurement component as described with reference to FIGS. 7 through 10.

At 1615 the UE 115 may report each of the plurality of sets of measured beam parameters to the base station. The operations of 1615 may be performed according to the methods described herein. In certain examples, aspects of the operations of 1615 may be performed by a measurement reporting component as described with reference to FIGS. 7 through 10.

At 1620 the UE 115 may receive, responsive to the reporting the plurality of sets of measured beam parameters, a plurality of TCI states for use in deterministically receiving a subsequent plurality of sequential transmission beams from the base station. The operations of 1620 may be performed according to the methods described herein. In certain examples, aspects of the operations of 1620 may be performed by a TCI manager as described with reference to FIGS. 7 through 10.

At 1625 the UE 115 may store the plurality of TCI states. The operations of 1625 may be performed according to the methods described herein. In certain examples, aspects of the operations of 1625 may be performed by a TCI manager as described with reference to FIGS. 7 through 10.

At 1630 the UE 115 may receive, from the base station, a second indication that the base station is starting transmission of the plurality of sequential transmission beams. The operations of 1630 may be performed according to the methods described herein. In certain examples, aspects of the operations of 1630 may be performed by a TCI manager as described with reference to FIGS. 7 through 10.

At 1635 the UE 115 may receive an indication of a first TCI state from the table of TCI states that is to be used in receiving a first transmission beam of the plurality of sequential transmission beams. The operations of 1635 may be performed according to the methods described herein. In certain examples, aspects of the operations of 1635 may be performed by a DCI component as described with reference to FIGS. 7 through 10.

At 1640 the UE 115 may receive the first transmission beam using receive beamforming parameters that are based at least in part on the first TCI state. The operations of 1640 may be performed according to the methods described herein. In certain examples, aspects of the operations of 1640 may be performed by a beamforming component as described with reference to FIGS. 7 through 10.

At 1645 the UE 115 may apply the plurality of TCI states in a deterministic manner to generate receive beamforming parameters for use in receiving each transmission beam of the plurality of sequential transmission beams. The operations of 1645 may be performed according to the methods described herein. In certain examples, aspects of the operations of 1645 may be performed by a TCI manager as described with reference to FIGS. 7 through 10.

Figure 17:
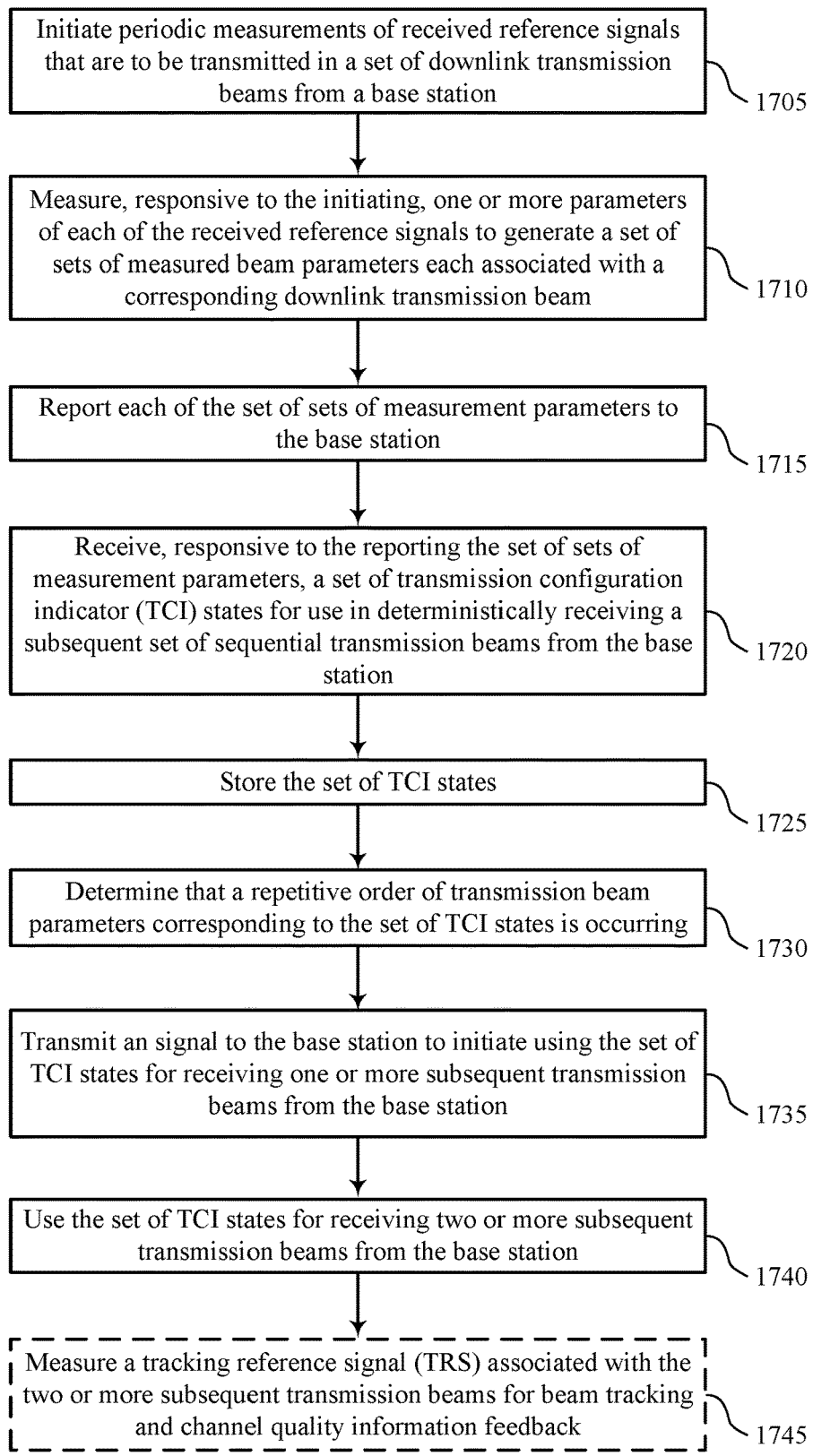

FIG. 17 shows a flowchart illustrating a method 1700 for beam tracking for periodic user equipment movement in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may initiate measurements of received reference signals that are to be transmitted in a plurality of downlink transmission beams from a base station. The operations of 1705 may be performed according to the methods described herein. In certain examples, aspects of the operations of 1705 may be performed by a beam tracking component as described with reference to FIGS. 7 through 10.

At 1710 the UE 115 may measure, responsive to the initiating, one or more parameters of each of the received reference signals to generate a plurality of sets of measured beam parameters each associated with a corresponding downlink transmission beam. The operations of 1710 may be performed according to the methods described herein. In certain examples, aspects of the operations of 1710 may be performed by a measurement component as described with reference to FIGS. 7 through 10.

At 1715 the UE 115 may report each of the plurality of sets of measured beam parameters to the base station. The operations of 1715 may be performed according to the methods described herein. In certain examples, aspects of the operations of 1715 may be performed by a measurement reporting component as described with reference to FIGS. 7 through 10.

At 1720 the UE 115 may receive, responsive to the reporting the plurality of sets of measured beam parameters, a plurality of TCI states for use in deterministically receiving a subsequent plurality of sequential transmission beams from the base station. The operations of 1720 may be performed according to the methods described herein. In certain examples, aspects of the operations of 1720 may be performed by a TCI manager as described with reference to FIGS. 7 through 10.

At 1725 the UE 115 may store the plurality of TCI states. The operations of 1725 may be performed according to the methods described herein. In certain examples, aspects of the operations of 1725 may be performed by a TCI manager as described with reference to FIGS. 7 through 10.

At 1730 the UE 115 may determine that a repetitive order of transmission beam parameters corresponding to the plurality of TCI states is occurring. The operations of 1730 may be performed according to the methods described herein. In certain examples, aspects of the operations of 1730 may be performed by a TCI manager as described with reference to FIGS. 7 through 10.

At 1735 the UE 115 may transmit a signal to the base station to initiate using the plurality of TCI states to receive one or more subsequent transmission beams from the base station. The operations of 1735 may be performed according to the methods described herein. In certain examples, aspects of the operations of 1735 may be performed by a TCI manager as described with reference to FIGS. 7 through 10.

At 1740 the UE 115 may use the plurality of TCI states to receive two or more subsequent transmission beams from the base station. The operations of 1740 may be performed according to the methods described herein. In certain examples, aspects of the operations of 1740 may be performed by a beamforming component as described with reference to FIGS. 7 through 10.

Optionally, at 1745 the UE 115 may measure a TRS associated with the two or more subsequent transmission beams for beam tracking and channel quality information feedback. The operations of 1745 may be performed according to the methods described herein. In certain examples, aspects of the operations of 1745 may be performed by a measurement component as described with reference to FIGS. 7 through 10.

Figure 18:
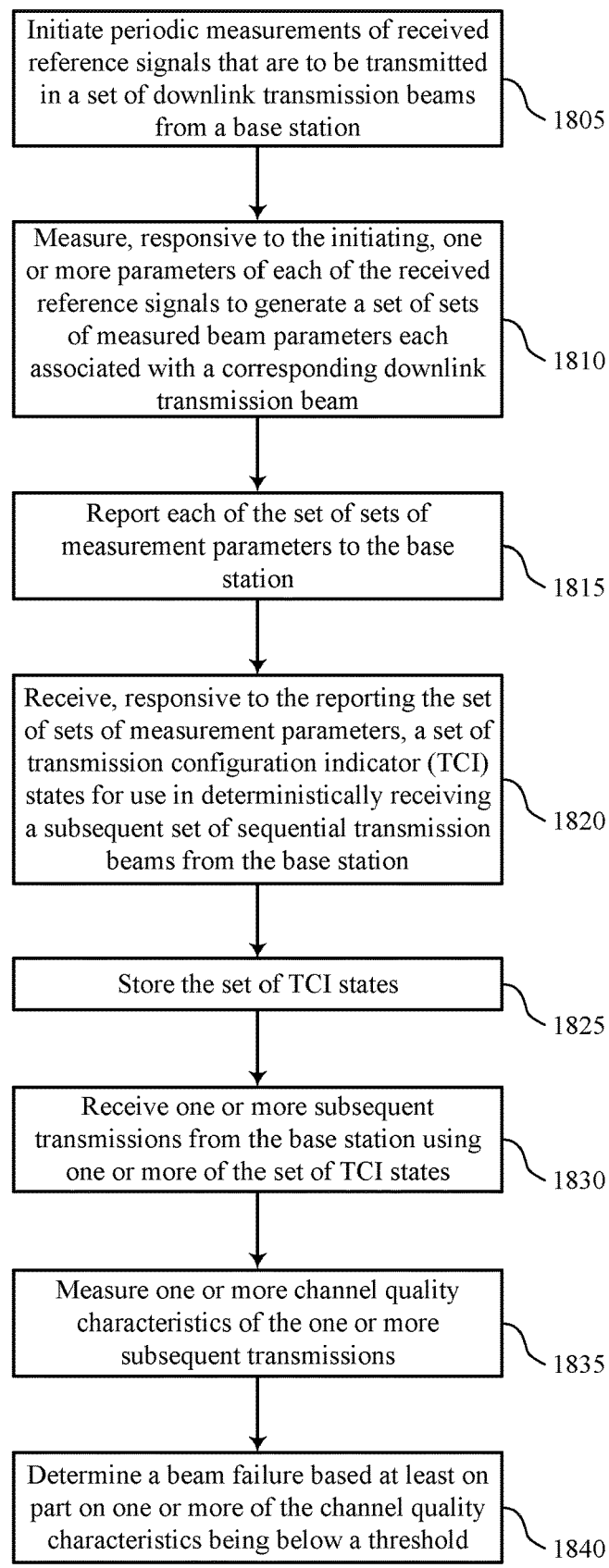

FIG. 18 shows a flowchart illustrating a method 1800 for beam tracking for periodic user equipment movement in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may initiate measurements of received reference signals that are to be transmitted in a plurality of downlink transmission beams from a base station. The operations of 1805 may be performed according to the methods described herein. In certain examples, aspects of the operations of 1805 may be performed by a beam tracking component as described with reference to FIGS. 7 through 10.

At 1810 the UE 115 may measure, responsive to the initiating, one or more parameters of each of the received reference signals to generate a plurality of sets of measured beam parameters each associated with a corresponding downlink transmission beam. The operations of 1810 may be performed according to the methods described herein. In certain examples, aspects of the operations of 1810 may be performed by a measurement component as described with reference to FIGS. 7 through 10.

At 1815 the UE 115 may report each of the plurality of sets of measured beam parameters to the base station. The operations of 1815 may be performed according to the methods described herein. In certain examples, aspects of the operations of 1815 may be performed by a measurement reporting component as described with reference to FIGS. 7 through 10.

At 1820 the UE 115 may receive, responsive to the reporting the plurality of sets of measured beam parameters, a plurality of TCI states for use in deterministically receiving a subsequent plurality of sequential transmission beams from the base station. The operations of 1820 may be performed according to the methods described herein. In certain examples, aspects of the operations of 1820 may be performed by a TCI manager as described with reference to FIGS. 7 through 10.

At 1825 the UE 115 may store the plurality of TCI states. The operations of 1825 may be performed according to the methods described herein. In certain examples, aspects of the operations of 1825 may be performed by a TCI manager as described with reference to FIGS. 7 through 10.

At 1830 the UE 115 may receive one or more subsequent transmissions from the base station using one or more of the plurality of TCI states. The operations of 1830 may be performed according to the methods described herein. In certain examples, aspects of the operations of 1830 may be performed by a beam failure component as described with reference to FIGS. 7 through 10.

At 1835 the UE 115 may measure one or more channel quality characteristics of the one or more subsequent transmissions. The operations of 1835 may be performed according to the methods described herein. In certain examples, aspects of the operations of 1835 may be performed by a beam failure component as described with reference to FIGS. 7 through 10.

At 1840 the UE 115 may determine a beam failure based at least on part on one or more of the channel quality characteristics being below a threshold. The operations of 1840 may be performed according to the methods described herein. In certain examples, aspects of the operations of 1840 may be performed by a beam failure component as described with reference to FIGS. 7 through 10.

Figure 19:
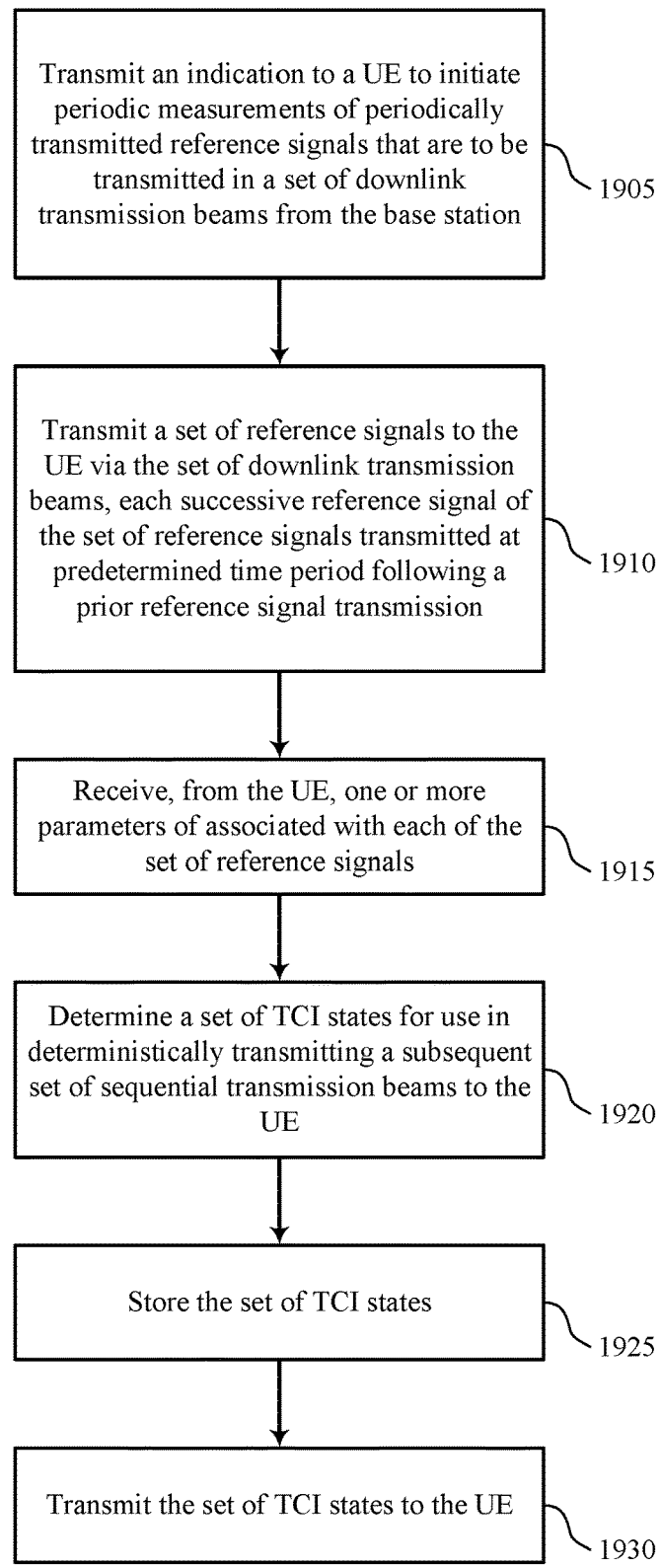

FIG. 19 shows a flowchart illustrating a method 1900 for beam tracking for periodic user equipment movement in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may transmit an indication to a UE to initiate measurements of periodically transmitted reference signals that are to be transmitted in a plurality of downlink transmission beams from the base station. The operations of 1905 may be performed according to the methods described herein. In certain examples, aspects of the operations of 1905 may be performed by a beam tracking component as described with reference to FIGS. 11 through 14.

At 1910 the base station 105 may transmit a plurality of reference signals to the UE via the plurality of downlink transmission beams, each successive reference signal of the plurality of reference signals transmitted at predetermined time period following a prior reference signal transmission. The operations of 1910 may be performed according to the methods described herein. In certain examples, aspects of the operations of 1910 may be performed by a beam tracking component as described with reference to FIGS. 11 through 14.

At 1915 the base station 105 may receive, from the UE, one or more parameters of associated with each of the plurality of reference signals. The operations of 1915 may be performed according to the methods described herein. In certain examples, aspects of the operations of 1915 may be performed by a measurement component as described with reference to FIGS. 11 through 14.

At 1920 the base station 105 may determine a plurality of TCI states for use in deterministically transmitting a subsequent plurality of sequential transmission beams to the UE. The operations of 1920 may be performed according to the methods described herein. In certain examples, aspects of the operations of 1920 may be performed by a TCI manager as described with reference to FIGS. 11 through 14.

At 1925 the base station 105 may store the plurality of TCI states. The operations of 1925 may be performed according to the methods described herein. In certain examples, aspects of the operations of 1925 may be performed by a TCI manager as described with reference to FIGS. 11 through 14.

At 1930 the base station 105 may transmit the plurality of TCI states to the UE. The operations of 1930 may be performed according to the methods described herein. In certain examples, aspects of the operations of 1930 may be performed by a TCI manager as described with reference to FIGS. 11 through 14.

Figure 20:
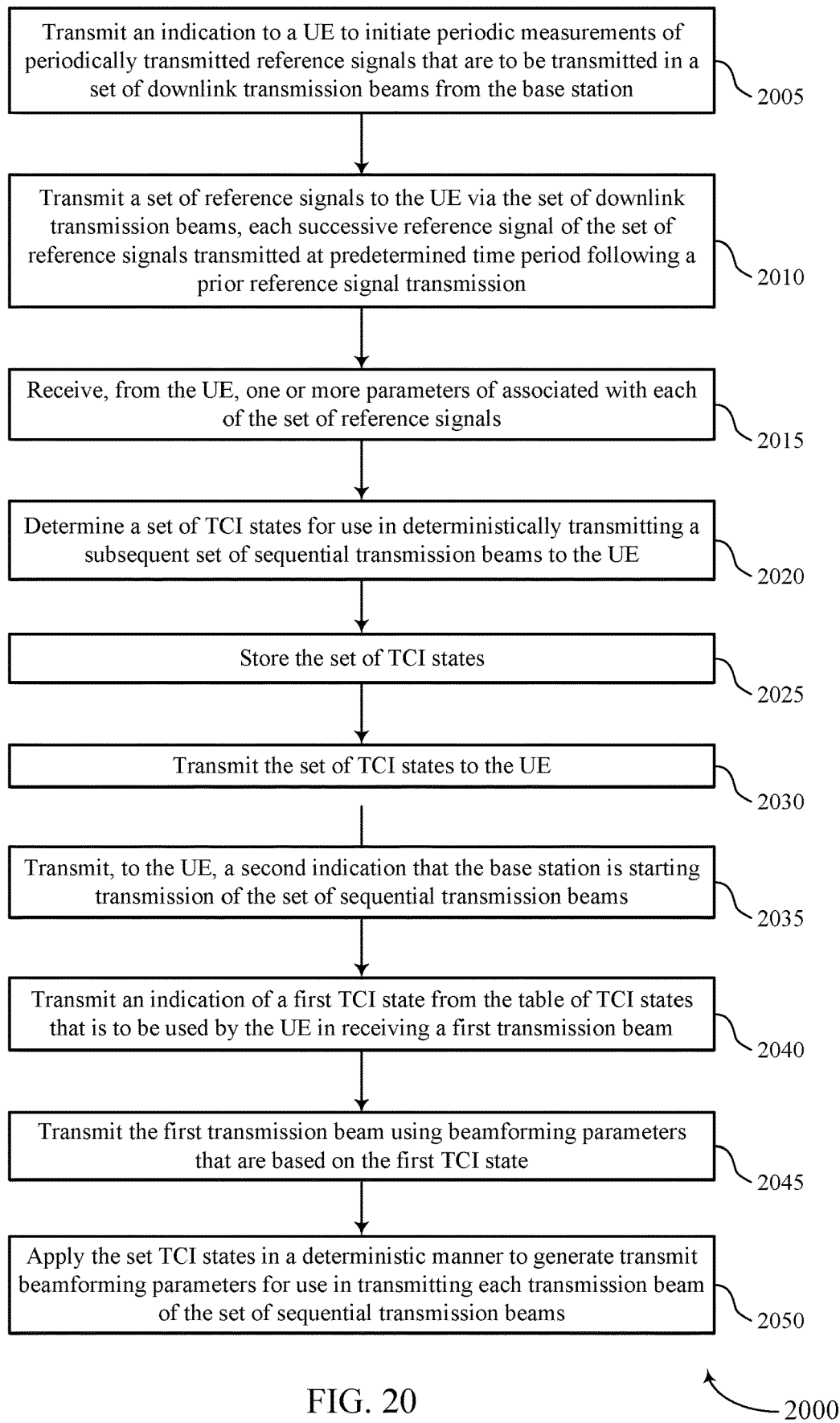

FIG. 20 shows a flowchart illustrating a method 2000 for beam tracking for periodic user equipment movement in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may transmit an indication to a UE to initiate measurements of periodically transmitted reference signals that are to be transmitted in a plurality of downlink transmission beams from the base station. The operations of 2005 may be performed according to the methods described herein. In certain examples, aspects of the operations of 2005 may be performed by a beam tracking component as described with reference to FIGS. 11 through 14.

At 2010 the base station 105 may transmit a plurality of reference signals to the UE via the plurality of downlink transmission beams, each successive reference signal of the plurality of reference signals transmitted at predetermined time period following a prior reference signal transmission. The operations of 2010 may be performed according to the methods described herein. In certain examples, aspects of the operations of 2010 may be performed by a beam tracking component as described with reference to FIGS. 11 through 14.

At 2015 the base station 105 may receive, from the UE, one or more parameters of associated with each of the plurality of reference signals. The operations of 2015 may be performed according to the methods described herein. In certain examples, aspects of the operations of 2015 may be performed by a measurement component as described with reference to FIGS. 11 through 14.

At 2020 the base station 105 may determine a plurality of TCI states for use in deterministically transmitting a subsequent plurality of sequential transmission beams to the UE. The operations of 2020 may be performed according to the methods described herein. In certain examples, aspects of the operations of 2020 may be performed by a TCI manager as described with reference to FIGS. 11 through 14.

At 2025 the base station 105 may store the plurality of TCI states. The operations of 2025 may be performed according to the methods described herein. In certain examples, aspects of the operations of 2025 may be performed by a TCI manager as described with reference to FIGS. 11 through 14.

At 2030 the base station 105 may transmit the plurality of TCI states to the UE. The operations of 2030 may be performed according to the methods described herein. In certain examples, aspects of the operations of 2030 may be performed by a TCI manager as described with reference to FIGS. 11 through 14.

At 2035 the base station 105 may transmit, to the UE, a second indication that the base station is starting transmission of the plurality of sequential transmission beams. The operations of 2035 may be performed according to the methods described herein. In certain examples, aspects of the operations of 2035 may be performed by a TCI manager as described with reference to FIGS. 11 through 14.

At 2040 the base station 105 may transmit an indication of a first TCI state from the table of TCI states that is to be used by the UE in receiving a first transmission beam. The operations of 2040 may be performed according to the methods described herein. In certain examples, aspects of the operations of 2040 may be performed by a DCI component as described with reference to FIGS. 11 through 14.

At 2045 the base station 105 may transmit the first transmission beam using beamforming parameters that are based at least in part on the first TCI state. The operations of 2045 may be performed according to the methods described herein. In certain examples, aspects of the operations of 2045 may be performed by a beamforming component as described with reference to FIGS. 11 through 14.

At 2050 the base station 105 may apply the plurality TCI states in a deterministic manner to generate transmit beamforming parameters for use in transmitting each transmission beam of the plurality of sequential transmission beams. The operations of 2050 may be performed according to the methods described herein. In certain examples, aspects of the operations of 2050 may be performed by a TCI manager as described with reference to FIGS. 11 through 14.

Figure 21:
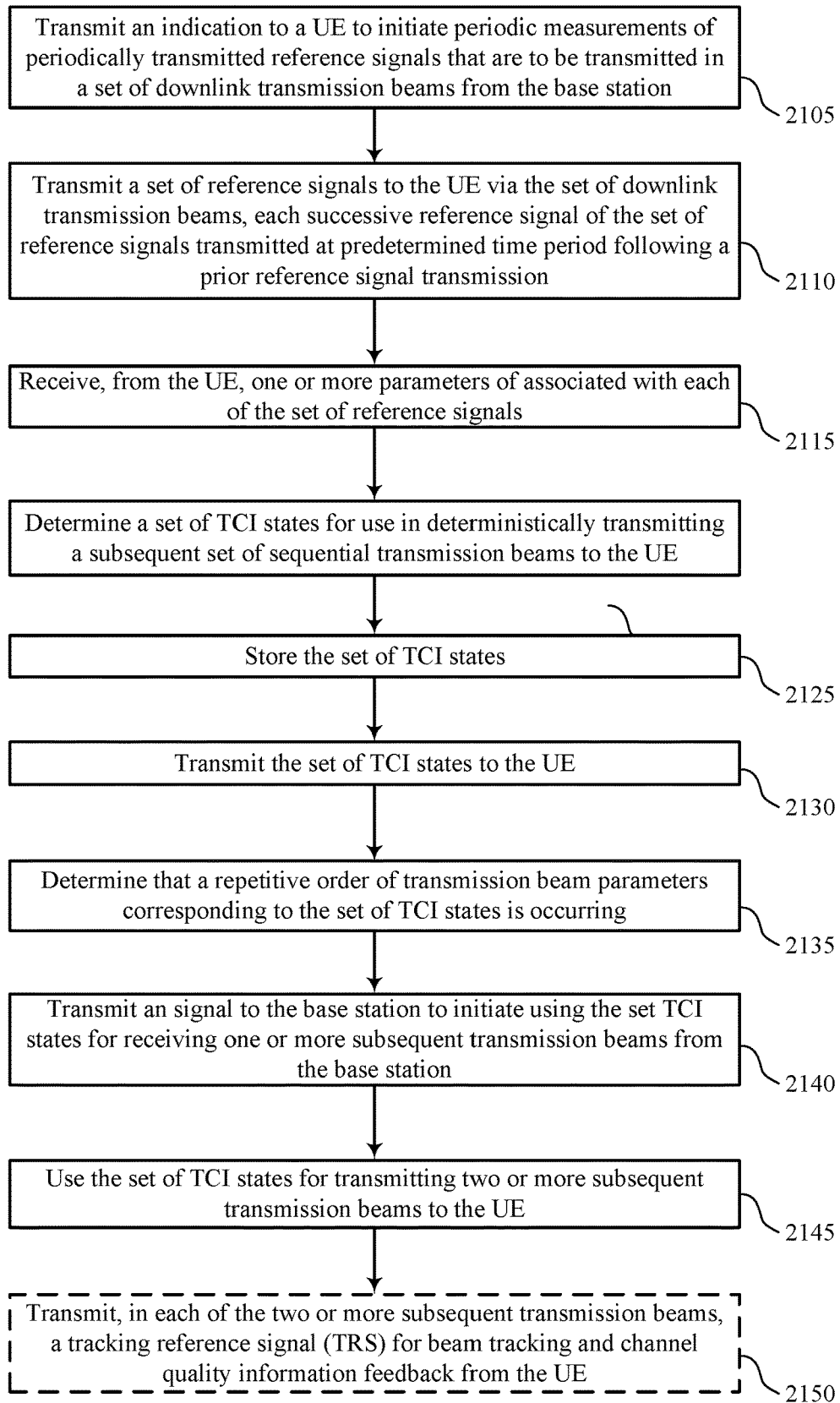

FIG. 21 shows a flowchart illustrating a method 2100 for beam tracking for periodic user equipment movement in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may transmit an indication to a UE to initiate measurements of periodically transmitted reference signals that are to be transmitted in a plurality of downlink transmission beams from the base station. The operations of 2105 may be performed according to the methods described herein. In certain examples, aspects of the operations of 2105 may be performed by a beam tracking component as described with reference to FIGS. 11 through 14.

At 2110 the base station 105 may transmit a plurality of reference signals to the UE via the plurality of downlink transmission beams, each successive reference signal of the plurality of reference signals transmitted at predetermined time period following a prior reference signal transmission. The operations of 2110 may be performed according to the methods described herein. In certain examples, aspects of the operations of 2110 may be performed by a beam tracking component as described with reference to FIGS. 11 through 14.

At 2115 the base station 105 may receive, from the UE, one or more parameters of associated with each of the plurality of reference signals. The operations of 2115 may be performed according to the methods described herein. In certain examples, aspects of the operations of 2115 may be performed by a measurement component as described with reference to FIGS. 11 through 14.

At 2120 the base station 105 may determine a plurality of TCI states for use in deterministically transmitting a subsequent plurality of sequential transmission beams to the UE. The operations of 2120 may be performed according to the methods described herein. In certain examples, aspects of the operations of 2120 may be performed by a TCI manager as described with reference to FIGS. 11 through 14.

At 2125 the base station 105 may store the plurality of TCI states. The operations of 2125 may be performed according to the methods described herein. In certain examples, aspects of the operations of 2125 may be performed by a TCI manager as described with reference to FIGS. 11 through 14.

At 2130 the base station 105 may transmit the plurality of TCI states to the UE. The operations of 2130 may be performed according to the methods described herein. In certain examples, aspects of the operations of 2130 may be performed by a TCI manager as described with reference to FIGS. 11 through 14.

At 2135 the base station 105 may determine that a repetitive order of transmission beam parameters corresponding to the plurality of TCI states is occurring. The operations of 2135 may be performed according to the methods described herein. In certain examples, aspects of the operations of 2135 may be performed by a TCI manager as described with reference to FIGS. 11 through 14.

At 2140 the base station 105 may transmit a signal to the base station to initiate using the plurality TCI states to receive one or more subsequent transmission beams from the base station. The operations of 2140 may be performed according to the methods described herein. In certain examples, aspects of the operations of 2140 may be performed by a TCI manager as described with reference to FIGS. 11 through 14.

At 2145 the base station 105 may use the plurality of TCI states for transmitting two or more subsequent transmission beams to the UE. The operations of 2145 may be performed according to the methods described herein. In certain examples, aspects of the operations of 2145 may be performed by a TCI manager as described with reference to FIGS. 11 through 14.

Optionally, at 2150 the base station 105 may transmit, in each of the two or more subsequent transmission beams, a TRS for beam tracking and channel quality information feedback from the UE. The operations of 2150 may be performed according to the methods described herein. In certain examples, aspects of the operations of 2150 may be performed by a beamforming component as described with reference to FIGS. 11 through 14.

Figure 22:
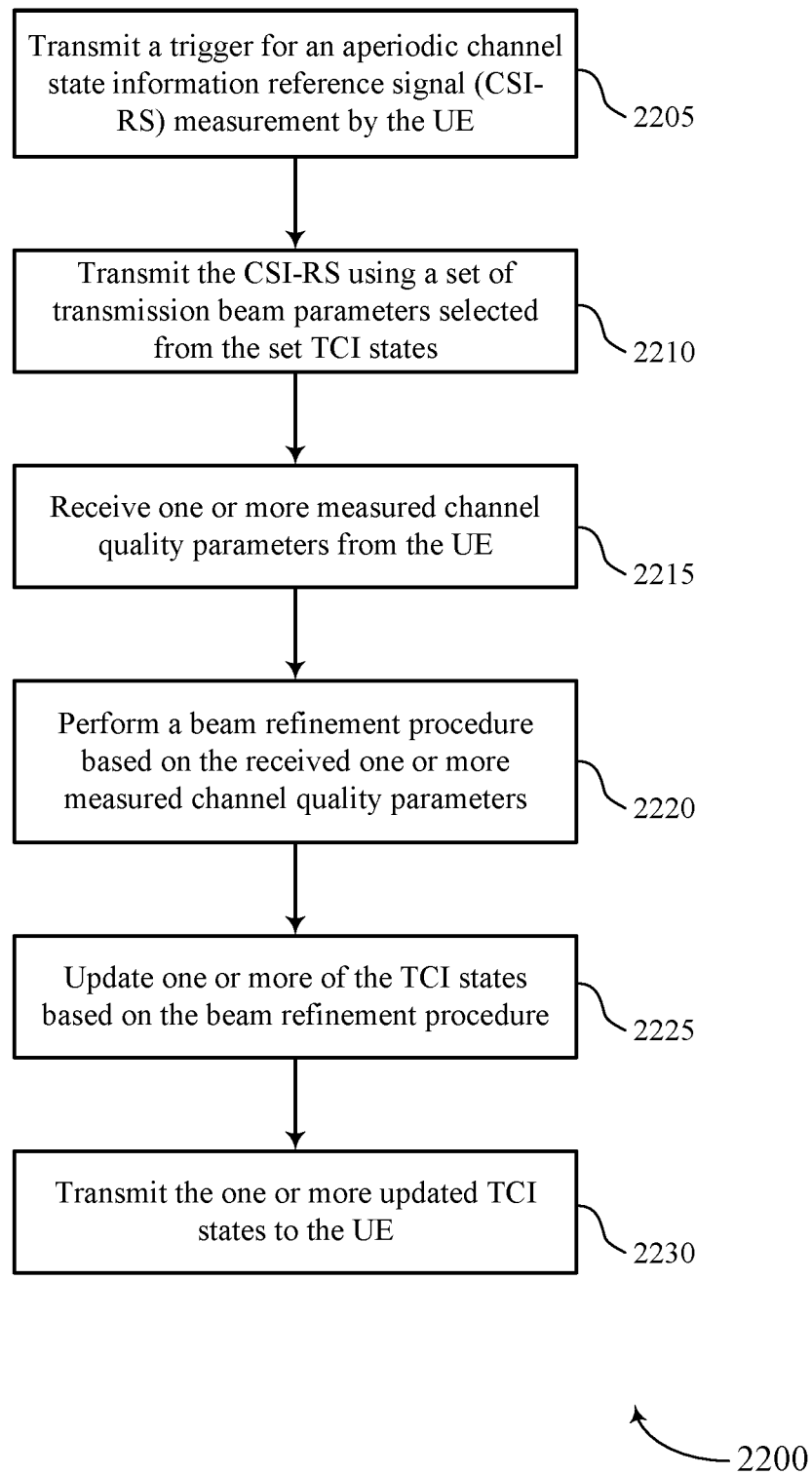

FIG. 22 shows a flowchart illustrating a method 2200 for beam tracking for periodic user equipment movement in accordance with aspects of the present disclosure. The operations of method 2200 may be implemented by a base station 105 or its components as described herein after completing the operations as discussed above with respect to FIG. 19. For example, the operations of method 2200 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may transmit a trigger for an aperiodic CSI-RS measurement by the UE. The operations of 2205 may be performed according to the methods described herein. In certain examples, aspects of the operations of 2205 may be performed by a measurement component as described with reference to FIGS. 11 through 14.

At 2210 the base station 105 may transmit the CSI-RS using a set of transmission beam parameters selected from the plurality TCI states. The operations of 2210 may be performed according to the methods described herein. In certain examples, aspects of the operations of 2210 may be performed by a beamforming component as described with reference to FIGS. 11 through 14.

At 2215 the base station 105 may receive one or more measured channel quality parameters from the UE. The operations of 2215 may be performed according to the methods described herein. In certain examples, aspects of the operations of 2215 may be performed by a measurement component as described with reference to FIGS. 11 through 14.

At 2220 the base station 105 may perform a beam refinement procedure based at least in part on the received one or more measured channel quality parameters. The operations of 2220 may be performed according to the methods described herein. In certain examples, aspects of the operations of 2220 may be performed by a beam tracking component as described with reference to FIGS. 11 through 14.

At 2225 the base station 105 may update one or more of the TCI states based at least in part on the beam refinement procedure. The operations of 2225 may be performed according to the methods described herein. In certain examples, aspects of the operations of 2225 may be performed by a TCI manager as described with reference to FIGS. 11 through 14.

At 2230 the base station 105 may transmit the one or more updated TCI states to the UE. The operations of 2230 may be performed according to the methods described herein. In certain examples, aspects of the operations of 2230 may be performed by a TCI manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

initiating, at a user equipment (UE), measurements of received reference signals that are to be transmitted in a plurality of downlink transmission beams from a base station;

measuring, responsive to the initiating, one or more parameters of each of the received reference signals to generate a plurality of sets of measured beam parameters each associated with a corresponding downlink transmission beam;

reporting, to the base station, each of the plurality of sets of measured beam parameters;

receiving, responsive to the reporting the plurality of sets of measured beam parameters, a plurality of transmission configuration indicator (TCI) states associated with an order for receiving a subsequent plurality of sequential transmission beams from the base station;

determining that a repetitive order of transmission beam parameters corresponding to the plurality of TCI states is occurring, wherein the order for receiving the subsequent plurality of sequential transmission beams is based at least in part on the repetitive order; and storing, at the UE, the plurality of TCI states.

2. The method of claim 1, wherein the measuring the one or more parameters of each of the received reference signals comprises:
   measuring a first reference signal in a first transmission slot; and
   measuring one or more subsequent reference signals in one or more subsequent transmission slots, each of the one or more subsequent transmission slots being at predetermined intervals.

3. The method of claim 2, wherein the predetermined intervals are configured at the UE by the base station.

4. The method of claim 1, wherein the initiating the measurements of received reference signals comprises:
   receiving a trigger indication from the base station to initiate the measurements of received reference signals.

5. The method of claim 4, wherein the trigger indication is received in radio resource control (RRC) signaling, a medium access control (MAC) control element, in downlink control information (DCI), or any combination thereof.

6. The method of claim 1, further comprising:
   receiving, from the base station, a second indication that the base station is starting transmission of the plurality of sequential transmission beams; and
   applying the plurality of TCI states in a deterministic manner according to the order for receiving the subsequent plurality of sequential transmission beams to generate receive beamforming parameters for use in receiving each transmission beam of the plurality of sequential transmission beams.

7. The method of claim 6, wherein the second indication is received in a downlink control information (DCI) transmission from the base station, in a medium access control (MAC) control element from the base station, in radio resource control signaling from the base station, or any combination thereof.

8. The method of claim 6, wherein the applying the plurality of TCI states comprises:
   identifying a first TCI state of the plurality of TCI states for a first transmission beam of the plurality of sequential transmission beams; and
   identifying subsequent TCI states of the plurality of TCI states for remaining transmission beams of the plurality of sequential transmission beams based at least in part on the first TCI state and subsequent deterministic TCI states that follow the first TCI state.

9. The method of claim 8, wherein the identifying the subsequent TCI states is performed independently of signaling from the base station.

10. The method of claim 1, wherein the plurality of TCI states comprises a table of TCI states, and wherein the method further comprises:
    receiving an indication of a first TCI state from the table of TCI states that is to be used in receiving a first transmission beam of the plurality of sequential transmission beams; and
    receiving the first transmission beam using receive beamforming parameters that are based at least in part on the first TCI state.

11. The method of claim 10, wherein the UE stores a plurality of analog beamforming weight configurations that each have an associated identification (ID), and wherein each TCI state of the plurality of TCI states indicates an ID for one of the plurality of analog beamforming weight configurations.

12. The method of claim 10, wherein the plurality of TCI states comprises a first subset of TCI states for receiving control resource set transmission beams and a second subset TCI states for receiving physical downlink shared channel (PDSCH) transmission beams.

13. The method of claim 1, wherein the measuring one or more parameters of each of a plurality of reference signals is performed as part of a beam selection procedure, a beam refinement procedure, or any combinations thereof.

14. The method of claim 1, further comprising:
    repeating the measuring, the reporting, and the receiving until a deactivation of the measurements of received reference signals.

15. The method of claim 14, wherein the deactivation corresponds to an expiration of a timer associated with the measurements of received reference signals or a receipt of a deactivation indication from the base station.

16. The method of claim 1, further comprising:
    transmitting a signal to the base station to initiate using the plurality of TCI states to receive one or more subsequent transmission beams from the base station.

17. The method of claim 1, further comprising:
    using the plurality of TCI states to receive two or more subsequent transmission beams from the base station; and
    measuring a tracking reference signal (TRS) associated with the two or more subsequent transmission beams for beam tracking and channel quality information feedback.

18. The method of claim 17, wherein the one or more parameters for the TRS are determined based at least in part on the plurality of TCI states.

19. The method of claim 1, further comprising:
    receiving a trigger for an aperiodic channel state information reference signal (CSI-RS) measurement from the base station;
    receiving the CSI-RS using a TCI state selected from the plurality of TCI states;
    measuring one or more channel quality parameters based on the CSI-RS; and
    transmitting the measured one or more channel quality parameters to the base station.

20. The method of claim 19, further comprising:
    receiving one or more TCI states based on the measured one or more channel quality parameters.

21. The method of claim 1, further comprising:
    receiving one or more subsequent transmissions from the base station using one or more of the plurality of TCI states;
    measuring one or more channel quality characteristics of the one or more subsequent transmissions; and
    determining a beam failure based at least on part on one or more of the channel quality characteristics being below a threshold.

22. The method of claim 1, wherein the measurements comprise periodic measurements, or semi-periodic measurements, or a combination thereof.

23. The method of claim 1, wherein:
    measuring the one or more parameters comprises:
       measuring the one or more parameters of the received reference signals from a first transmission reception point (TRP) to generate a first set of measured beam parameters; and
       measuring the one or more parameters of the received reference signals from a second TRP to generate a second set of measured beam parameters; and
    receiving the plurality of TCI states comprises receiving a first TCI state associated with a first TRP of the plurality of TCI states, and a second TCI state associated with a second TRP of the plurality of TCI states.

24. An apparatus for wireless communication, comprising:
  means for initiating, at a user equipment (UE), measurements of received reference signals that are to be transmitted in a plurality of downlink transmission beams from a base station;
  means for measuring, responsive to the initiating, one or more parameters of each of the received reference signals to generate a plurality of sets of measured beam parameters each associated with a corresponding downlink transmission beam;
  means for reporting each of the plurality of sets of measured beam parameters to the base station;
  means for receiving, responsive to the reporting the plurality of sets of measured beam parameters, a plurality of transmission configuration indicator (TCI) states associated with an order for receiving a subsequent plurality of sequential transmission beams from the base station;
  means for determining that a repetitive order of transmission beam parameters corresponding to the plurality of TCI states is occurring, wherein the order for receiving the subsequent plurality of sequential transmission beams is based at least in part on the repetitive order; and
  means for storing, at the UE, the plurality of TCI states.

25. An apparatus for wireless communication, comprising:
  a processor;
  memory in electronic communication with the processor; and
  instructions stored in the memory and executable by the processor to cause the apparatus to:
    initiate, at a user equipment (UE), measurements of received reference signals that are to be transmitted in a plurality of downlink transmission beams from a base station;
    measure, responsive to the initiating, one or more parameters of each of the received reference signals to generate a plurality of sets of measured beam parameters each associated with a corresponding downlink transmission beam;
    report each of the plurality of sets of measured beam parameters to the base station;
    receive, responsive to the reporting the plurality of sets of measured beam parameters, a plurality of transmission configuration indicator (TCI) states associated with an order for receiving a subsequent plurality of sequential transmission beams from the base station;
    determine that a repetitive order of transmission beam parameters corresponding to the plurality of TCI states is occurring, wherein the order for receiving the subsequent plurality of sequential transmission beams is based at least in part on the repetitive order; and
    store, at the UE, the plurality of TCI states.

26. The apparatus of claim 25, wherein the instructions are further executable by the processor to cause the apparatus to:
  receive, from the base station, a second indication that the base station is starting transmission of the plurality of sequential transmission beams; and
  apply the plurality of TCI states in a deterministic manner to generate receive beamforming parameters for use in receiving each transmission beam of the plurality of sequential transmission beams.

27. The apparatus of claim 26, wherein the applying the plurality of TCI states comprises identifying a first TCI state of the plurality of TCI states for a first transmission beam of the plurality of sequential transmission beams, and identifying subsequent TCI states of the plurality of TCI states for remaining transmission beams of the plurality of sequential transmission beams based at least in part on the first TCI state and subsequent deterministic TCI states that follow the first TCI state.

28. The apparatus of claim 25, wherein the instructions are further executable by the processor to cause the apparatus to:
  receive a trigger for an aperiodic channel state information reference signal (CSI-RS) measurement from the base station;
  receive the CSI-RS using a TCI state selected from the plurality of TCI states;
  measure one or more channel quality parameters based on the CSI-RS; and
  transmit the measured one or more channel quality parameters to the base station.

29. A non-transitory computer-readable medium storing code for wireless communication, the code comprising instructions executable by a processor to:
  initiate, at a user equipment (UE), measurements of received reference signals that are to be transmitted in a plurality of downlink transmission beams from a base station;
  measure, responsive to the initiating, one or more parameters of each of the received reference signals to generate a plurality of sets of measured beam parameters each associated with a corresponding downlink transmission beam;
  report each of the plurality of sets of measured beam parameters to the base station;
  receive, responsive to the reporting the plurality of sets of measured beam parameters, a plurality of transmission configuration indicator (TCI) states associated with an order for receiving a subsequent plurality of sequential transmission beams from the base station;
  determine that a repetitive order of transmission beam parameters corresponding to the plurality of TCI states is occurring, wherein the order for receiving the subsequent plurality of sequential transmission beams is based at least in part on the repetitive order; and
  store, at the UE, the plurality of TCI states.

* * * * *